INVENTORS:
ROBERT P. SHEA, OSCAR H. JAROSCH,
LINWOOD G. DUNN, CECIL D. LOVE,
BY
*Robert W. Fulwider*
ATTORNEY

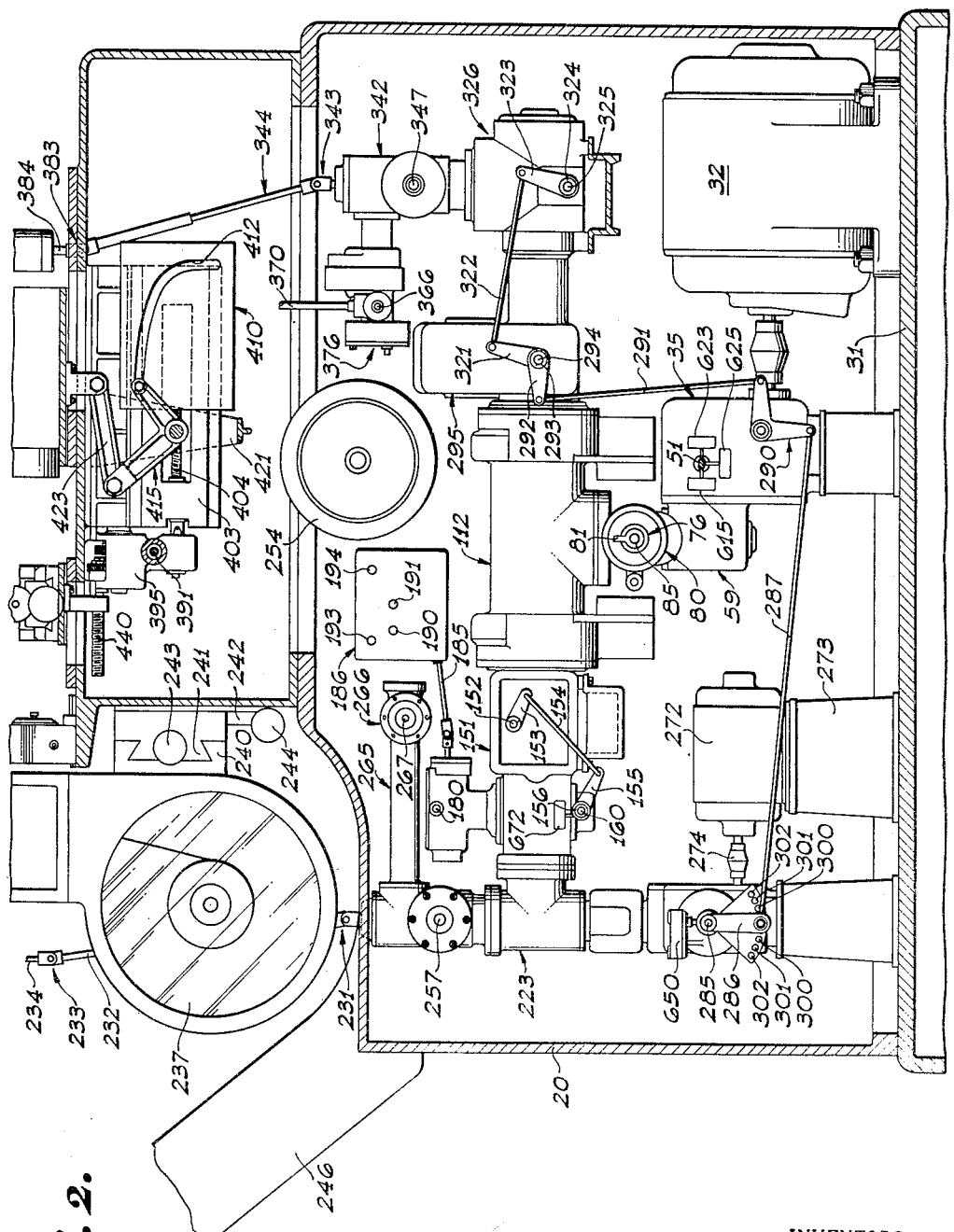

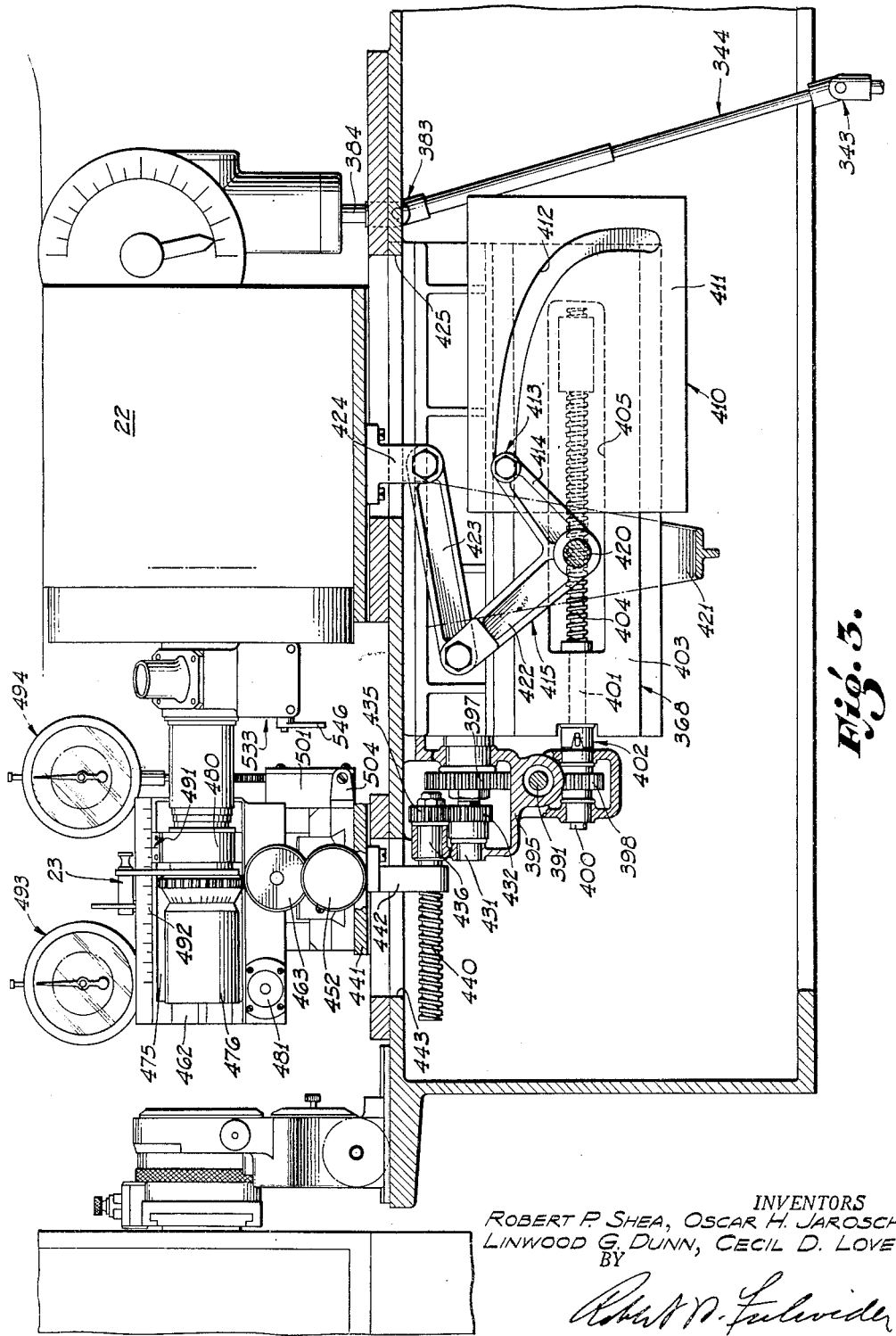

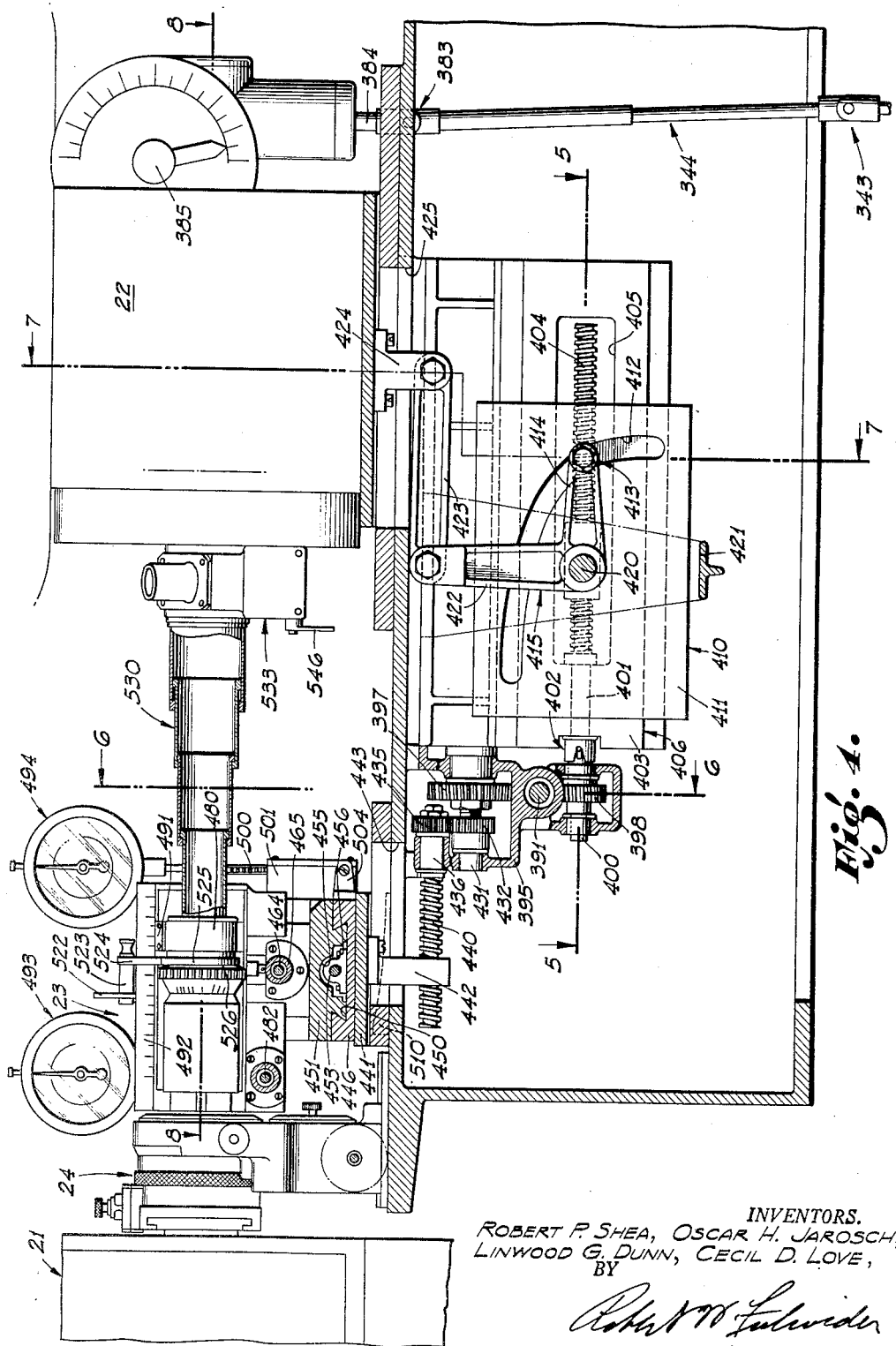

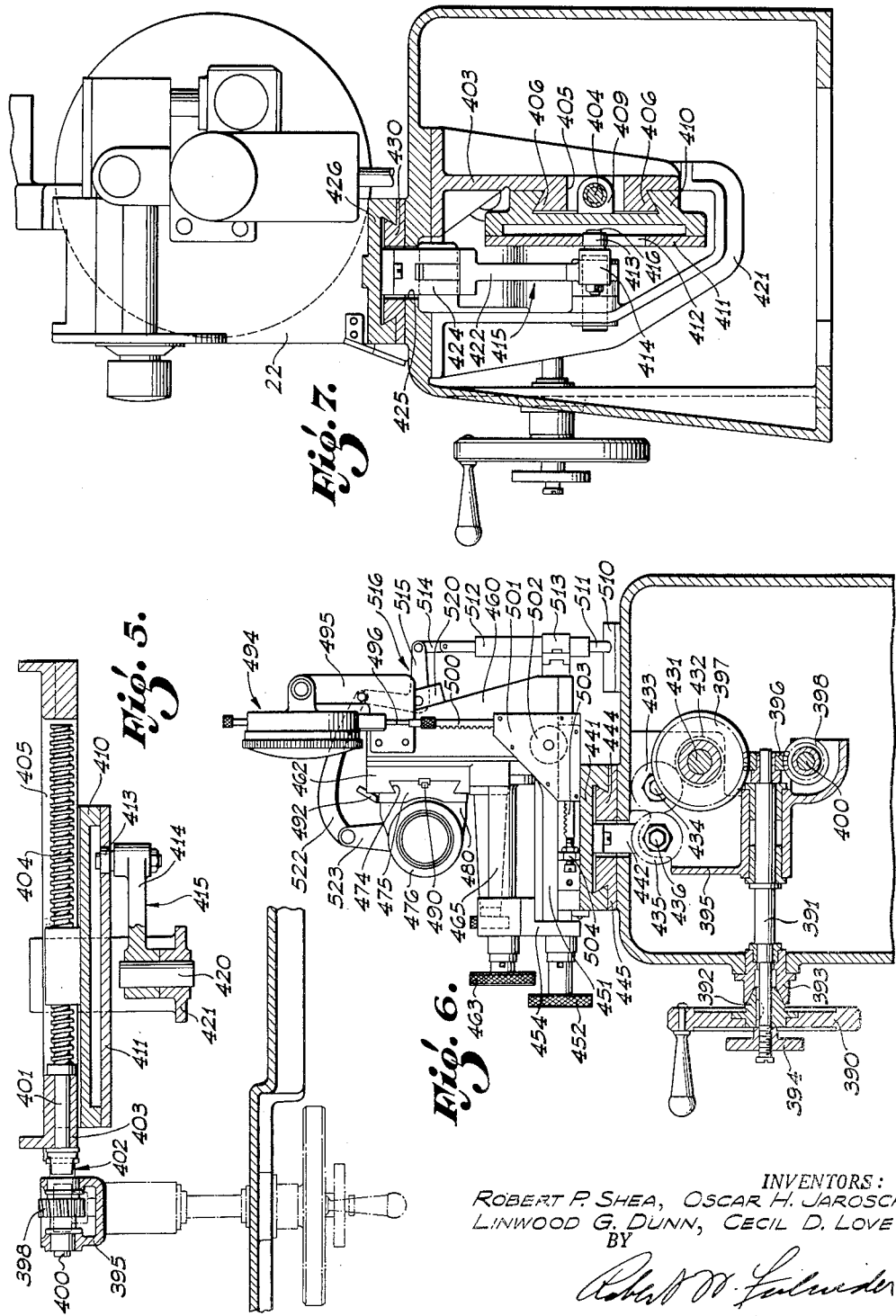

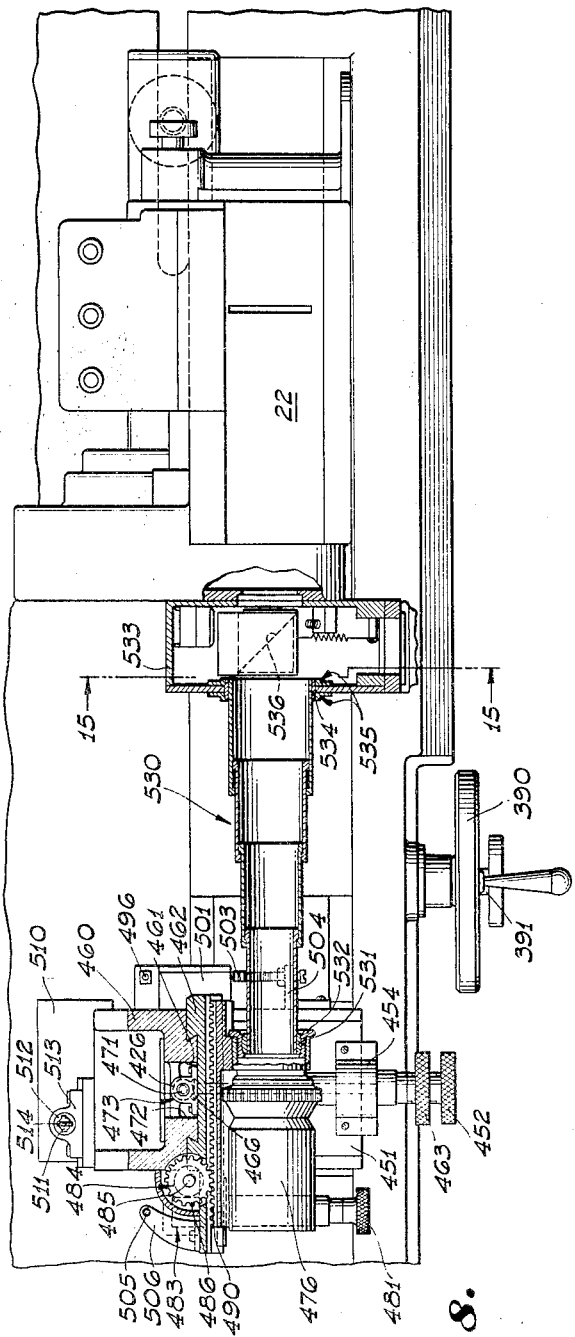
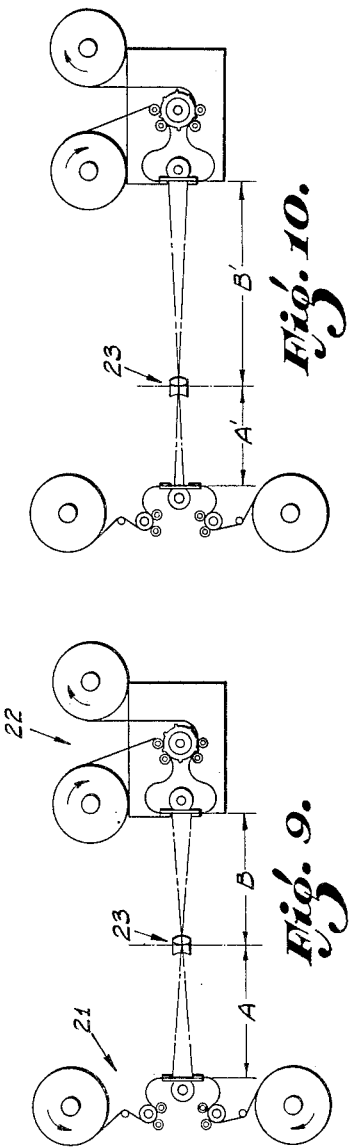

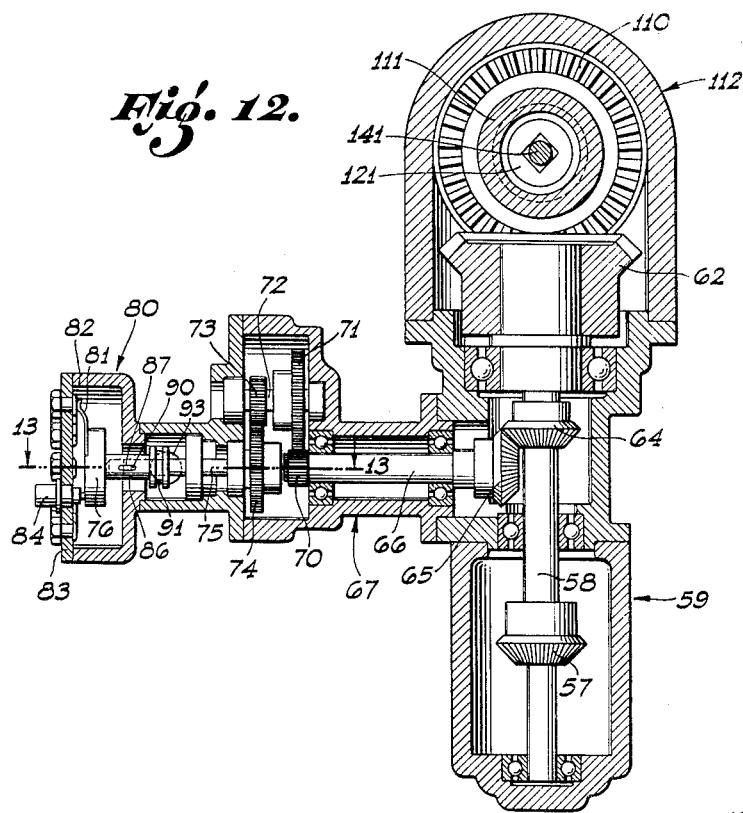
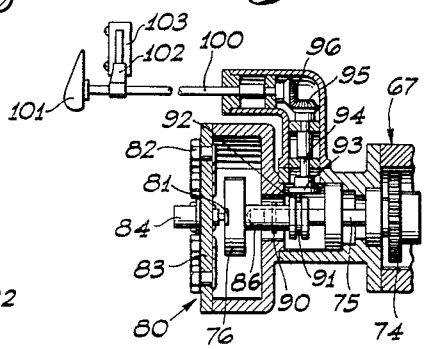
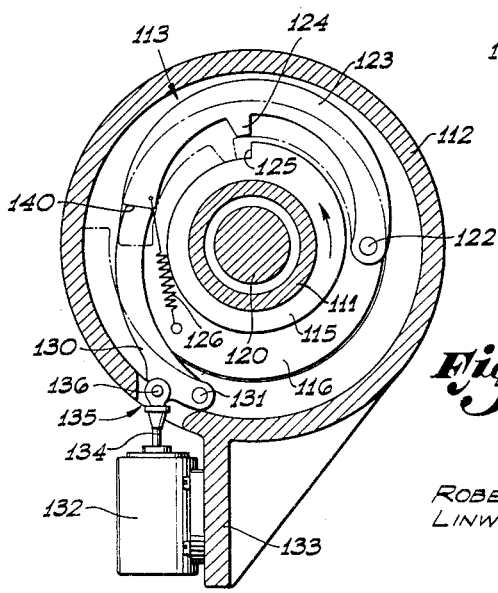

INVENTORS:
ROBERT P. SHEA, OSCAR H. JAROSCH,
LINWOOD G. DUNN, CECIL D. LOVE,
BY
ATTORNEY

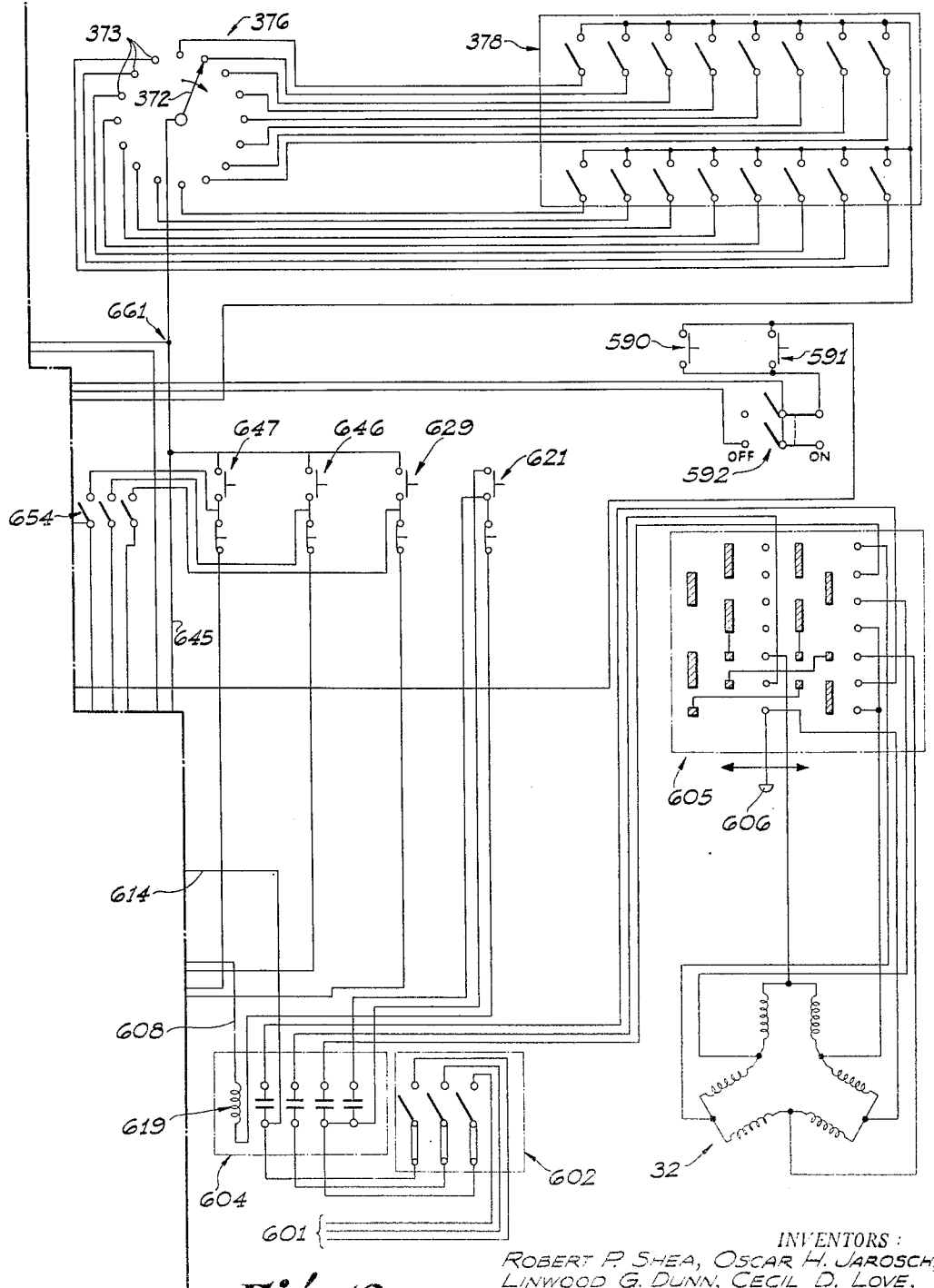

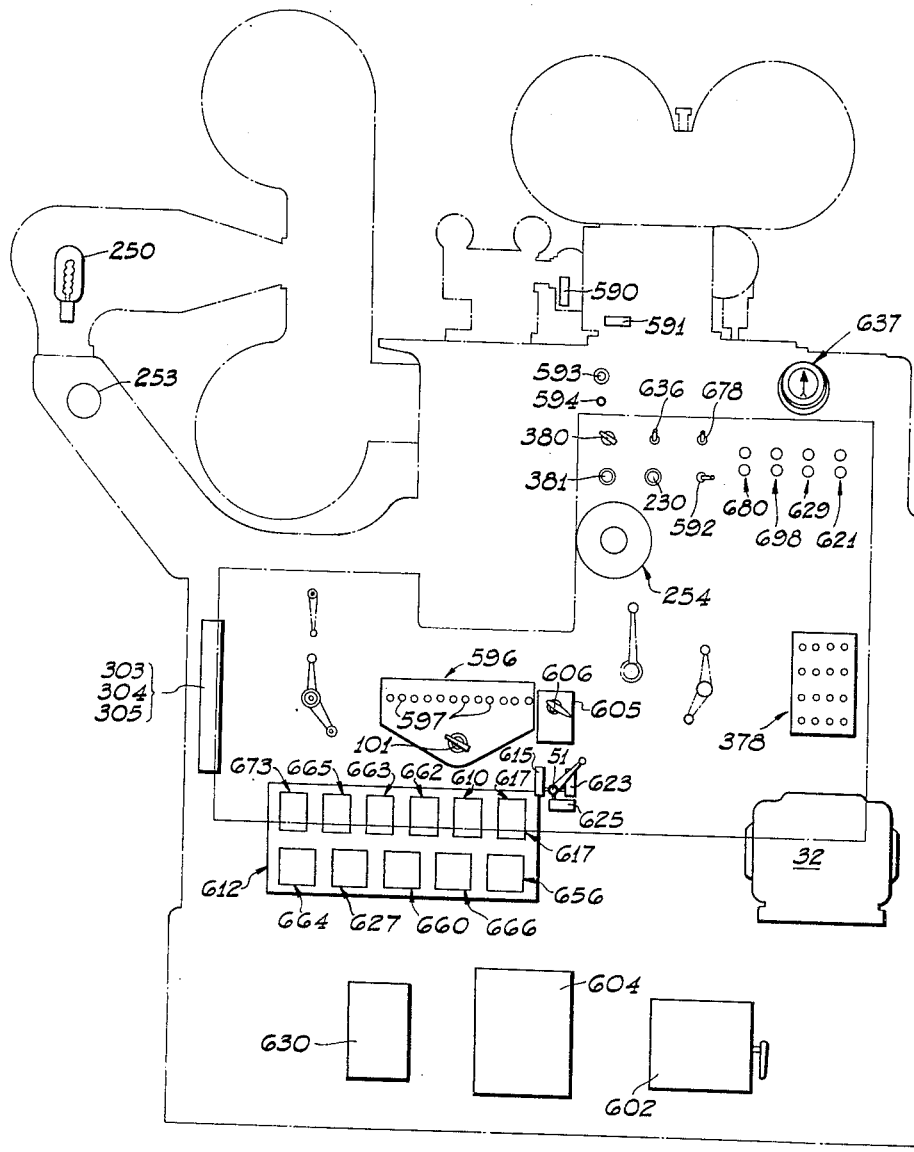

Patented Aug. 1, 1950

2,517,250

UNITED STATES PATENT OFFICE 2,517,250

OPTICAL PRINTER WITH AUTOMATIC ELECTRICAL CONTROL OF OPERATING MECHANISM

Robert P. Shea, North Hollywood, and Oscar H. Jarosch, Linwood G. Dunn, and Cecil D. Love, Los Angeles, Calif.; said Shea and said Jarosch assignors to Edward Furer, Burbank, Calif.

Application April 17, 1946, Serial No. 662,786

30 Claims. (Cl. 88—24)

The present invention relates to optical printers of the type used in the motion picture studios for creating special effects, such as dissolves, wipe-offs, reverse action, stop-motion, double exposures, dolly and "zoom" shots, and innumerable other effects from film originally photographed in the studio by straight-forward camera techniques. Another important use of the optical printer is in the making of prints of one size from film of another size, and in making prints for 24-frame-per-second projection from film taken at 16 frames per second. Other uses of the optical printer are for the improvement of the photographic quality of the scene with respect to density, composition, action, etc.; the speeding up or slowing down of the action; and the making of color separation negatives from full color prints.

Essentially, the optical printer consists of a projector mechanism through which a print of the original film is run, and a camera mechanism which is synchronized with the projector to photograph the print, frame by frame, together with an objective lens to focus the image of the print on the raw film in the camera. The many special effects are obtained by manipulation of the optical system, dissolving shutter in the camera, film driving mechanism in the projector and camera, and various accessory devices that can be used with the machine. Prior optical printers have been developed which are capable of producing all of the desired effects, but these machines, in general, have been manually operated at relatively slow speed and have lacked the speed, flexibility, and ease of operation necessary for handling the large volume of work and the many complex problems that are met in the modern motion picture studio and film laboratory.

It is a primary object of the present invention, therefore, to provide a new and improved optical printer having exceptional ease and flexibility of operation and capable of producing practically every known special effect that can be accomplished in a printer.

Another object of the invention is to provide an optical printer having means for making dolly or "zoom" shots at a speed greater than heretofore attainable, and of such excellent quality as to be indistinguishable from those shot on the studio set. A related object is the provision of means for automatically adjusting the iris diaphragm of the objective lens during the making of such "zoom" shots so as to compensate for variation in the distance between the lens and camera and maintain a constant ratio of the distance from lens to image to aperture diameter. The significance of this feature will be appreciated when it is remembered that the unit intensity of the light passed by the objective lens varies inversely as the square of the ratio of the distance from lens to image to the diameter of the aperture. Thus, if the image distance is doubled while the iris aperture remains fixed, the unit intensity of the light will drop off to one-fourth of its initial value, resulting in progressive under-exposure of the scene during the making of the "zoom" shot.

Another object of the invention is to provide an optical printer having means for automatically making frame combination prints in any predetermined sequency within a 12-frame cycle whereby prints of normal, or 24-frame per second speed can be made from film photographed at a different camera speed, or where it is desired to speed up or slow down the action in a film photographed at normal speed.

Another object of the invention is to provide an optical printer having means for automatically starting or stopping either the camera or projector or both on a particular frame of film within a given range of frames, making it possible to freeze the motion on said given frame and to resume motion when a predetermined number of exposures have been made of that frame.

Still another feature of the invention is the provision of means for producing an audible signal for each frame or for any interval of frames whereby the operator is enabled to count the number of frames passing through the camera while devoting his attention to the manipulation of any of the several adjustments.

A further object of the invention is to provide an optical printer having an objective lens which is adjustable both vertically and horizontally independent of the camera and projector, with dial indicators for indicating the exact position of the optical axis with respect to the center of the frame. This arrangement permits the breakdown of the lens travel between initial and terminal positions into equal increment for dolly or "zoom" shots, making it possible to complete the travel smoothly within a predetermined number of frames. Another advantage of this feature is that it enables the duplication of such an effect from noted indicator readings with absolute accuracy, as in the making of color separation negatives.

Another object of the invention is the provision of an optical printer incorporating separate stop-motion clutches in the camera and projector drive mechanism, with means for automatically actuating either or both clutches at any predetermined frame, making it possible to stop the machine in synchronism on an exact frame for the production of wipe-offs, hold frames, and other effects of similar nature, as well as for making fade-outs where the film being copied is too short and it is necessary to hold a frame during the uninterrupted course of the fade-out.

Still another object of the invention is to provide an optical printer having a view finder which, when inserted into the optical axis, diverts the image onto a ground glass having registration pins adapted to accommodate a frame of film for lining up purposes. This feature permits individual frame adjustments, making it possible to eliminate "shake" from a film due to camera movement, or to add "shake" if so desired.

These and other objects and advantages of the present invention will appear more fully hereinafter from a consideration of the detailed description which follows, when taken in connection with the accompanying drawings illustrating the preferred embodiment of the invention. It is to be expressly understood, however, that the drawings are for the purpose of illustration and description only, and are not intended or to be considered as defining the limits of the invention, reference being had to the appended claims for this purpose.

Figure 1 of the drawings is a front elevational view of a machine constructed according to the principles of the invention;

Figure 2 is an enlarged elevational view of the interior of the upper portion of the housing, the front of the housing being cut away;

Figure 3 is a still further enlarged elevational view of the mechanism for moving the camera and objective lens simultaneously in opposite directions and at such rates, respectively, to maintain sharp focus in the production of "zoom" shots, the mechanism being shown in the normal position with the camera frame taking in the full projector frame;

Figure 4 is a view similar to Fig. 3 but with the camera and lens moved to the position for a close-up wherein the camera frame takes in only a portion of the projector frame;

Figure 5 is a sectional view taken along the line 5—5 in Fig. 4;

Figure 6 is a sectional view taken along the line 6—6 in Fig. 4;

Figure 7 is a sectional view taken along the line 7—7 in Fig. 4;

Figure 8 is a sectional view taken along the line 8—8 in Fig. 4;

Figure 9 is a diagrammatic view showing the positions of the objective lens and the camera relative to one another and to the aperture in the projector for the normal printing condition corresponding to the view in Fig. 3;

Figure 10 is a similar view, but showing the relative positions of the parts in taking a close-up shot, corresponding to the view in Fig. 4;

Figure 12 is an enlarged vertical section through the transmission, taken along the line 12—12 in Fig. 11;

Figure 13 is a sectional view taken along the line 13—13 in Fig. 12;

Figure 14 is an enlarged sectional view taken along the line 14—14 in Fig. 11 and showing the construction and arrangement of the camera stop motion clutch;

Figure 19 is a wiring diagram of the other half of the circuit; and

Figure 20 is a phantom view of the machine, showing the location of the several units designated on the diagrams of Figs. 18 and 19.

Figure 1:
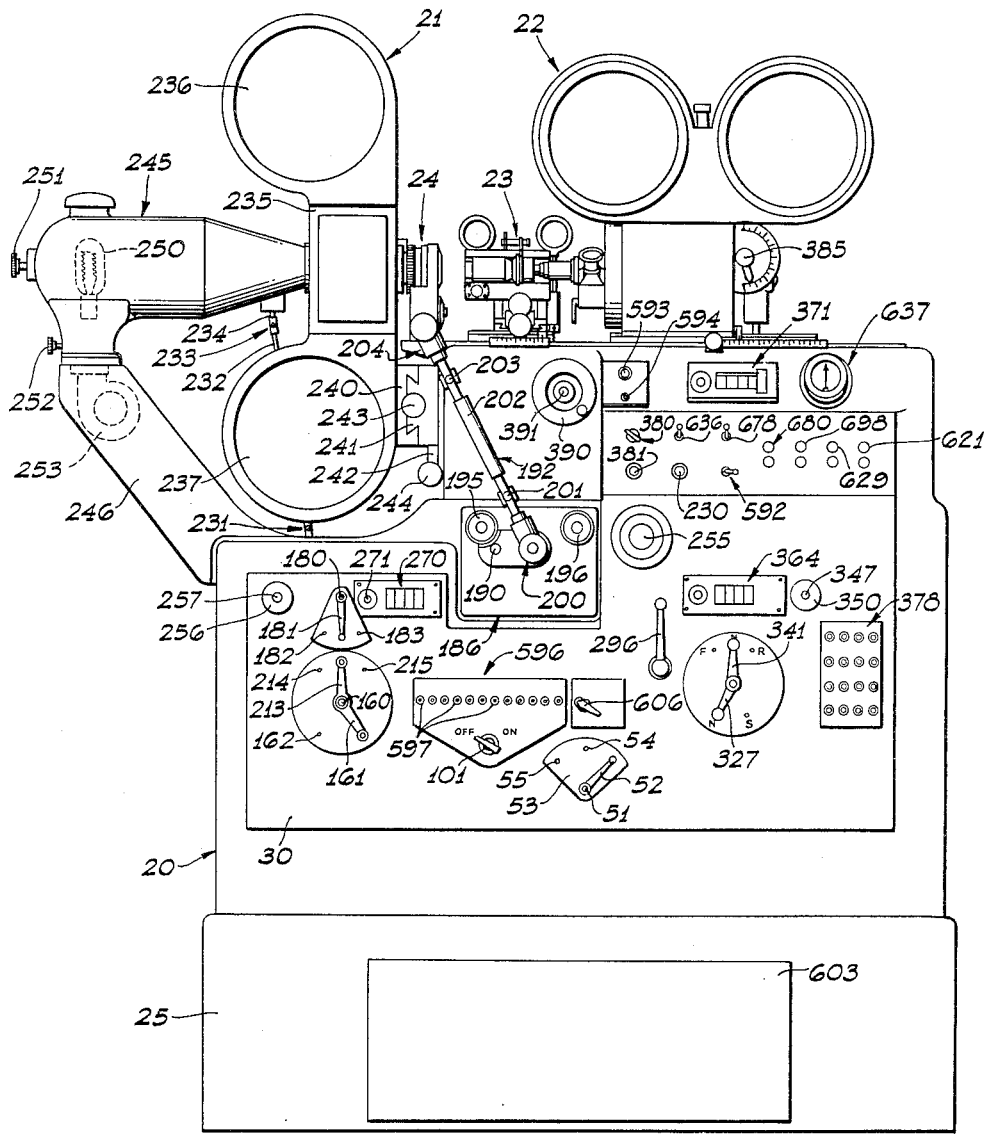

Referring now to the drawings, the machine comprises a housing 20 upon which are mounted a projector 21, camera 22, and objective lens unit 23. Provision is also made for mounting any of several available special effects accessory units 24 immediately in front of the projector aperture, such units being adapted for use in the making of wipe-offs, moving-split-screen shots, spins, tilts, flip-overs, and matte shots of all types.

The housing 20 is preferably of cast iron and is massively constructed for the utmost rigidity. The base 25 of the housing contains some of the electrical units of the machine, while the principal mechanisms, both mechanical and electrical, are contained in the upper portion of the housing and are accessible through a removable panel board 30 covering an opening in the front of the housing.

Mounted on a shelf 31 in the housing is a two-speed motor 32, the shaft of which is connected by a flexible coupling 33 to the drive shaft 34 (see Fig. 11) of a two-speed gear box 35. A gear 40 fixed on the shaft 34 meshes with a gear 41 comprising one of a pair of integral gears 42 having a common hub 43 which is splined to a shaft 44 and slidable thereon. The second gear 45 of the pair is adapted to mesh with a pinion 46 affixed on the shaft 34 when said pair of gears 42 is shifted axially along the shaft 44. The hub 43 extends axially from the side of the gear 45, and is provided with a circumferential groove which is engaged by a shift fork 50. The shift fork 50 is slidably mounted in the gear case 35 and is moved axially along the shaft 44 through the agency of a shaft 51 (see Figs. 1 and 2) to which it is connected by suitable linkage (not shown) which causes the fork to move axially when the shaft 51 is turned. The shaft 51 projects forwardly from the gear box 35 and through the panel 30, and has a shift lever 52 affixed to its outer end. The pitch diameters of the gears 40, 41, 45, and 46 are so proportioned that when gear 45 is meshed with gear 46, the shaft 44 is driven at one-third the speed obtained when gear 41 is meshed with gear 40. Thus it is seen that the two speeds obtained from the gear box 35 together with the full speed and half speed drives obtainable from the motor 32 make it possible to drive the mechanism at any one of four speeds, or to disengage the motor 32 entirely from the transmission by shifting the gear cluster 42 to an intermediate neutral position, out of mesh with either of gears 40 or 46. As shown in Fig. 1, the shift lever 52 is in normal or high-speed drive, and the position for neutral and low-gear drive are indicated on a dial plate 53 at 54 and 55, respectively.

The driven shaft 44 projects through the side of the gear housing 35 and has a bevel gear 56 affixed to its end which meshes with a mating bevel gear 57 mounted on a vertical shaft 58. The shaft 58 is journaled in suitable bearings in a housing 59 and has a bevel gear 62 affixed to its upper end. Also mounted on the shaft 58 just below gear 62 is a smaller bevel gear 64, the function of which is to drive one of the two distributors on the machine, as will now be described.

Meshing with the bevel gear 64 is a second bevel gear 65 which is fixedly mounted on a forwardly extending shaft 66 (see Fig. 12). Shaft 66 is journaled in suitable bearings in a housing 67 which is bolted to the housing 59, and mounted on the front end of said shaft is a pinion 70. Pinion 70 meshes with a gear 71 which is fixed on a rotatable counter shaft 72 positioned above and parallel to the shaft 66. Also fixed to the shaft 72 is a pinion 73 which meshes with a gear 74 mounted on the back end of a shaft 75 coaxial with shaft 66. The gear arrangement 70—75, inclusive, provides a twelve-to-one speed reduction, the purpose of which will become apparent as the present description progresses. The shaft 75 is journaled in suitable bearings in the housing 67, and slidably mounted on the front end thereof is the rotor head 76 of a distributor 80.

The function of the distributor 80 will be discussed more fully hereinafter, it being sufficient for the purpose at this point to mention merely that the rotor head 76 of the distributor has a spring finger 81 which sweeps over twelve contact points 82 carried by the cover plate 83, said points being arranged in a circle about the axis of the shaft 75 and spaced equidistantly apart. Electrical current is fed into the distributor head through a contact 84 which runs on a continuous slip-ring conductor 85 connected to the finger 81 (see Fig. 2), in which the cover plate has been removed from the distributor.

As pointed out previously, the rotor head 76 is slidably mounted on the end of the shaft 75, the purpose of this being to permit shifting the rotor head rearwardly so that the spring finger 81 clears the contacts 82, thereby rendering the distributor inoperative. To this end, the hub 86 of the rotor head has an axially extending slot 87 formed therein, and received within this slot is a pin 90 which extends diametrically through the shaft 75. The pin 90 thus causes the rotor head 76 to turn with the shaft 75, while permitting axial movement with respect thereto within the limits of the slot. At its rear end, the hub 86 is enlarged in diameter and has a circumferential groove 91 formed therein, said groove receiving an off-center pin 92 carried by a member 93. The member 93 is mounted on one end of a rotatable shaft 94, and fixed to the other end of said shaft is a bevel gear 95 which meshes with a companionate bevel gear 96. Gear 96 is fixed to the rear end of a shaft 100 which extends forwardly through the end of the housing and through the panel 30, there being a knob 101 on the front end thereof. An arm 102 fixed to the shaft 100 inside the machine is engageable with a microswitch 103 to actuate the latter, said microswitch being connected into the circuit of the distributor to open or close said circuit. Thus, when the knob 101 is in the "Off" position shown in Fig. 1, the member 93 is turned so that the rotor head 76 is held clear of the contacts 82 by the pin 92, and at the same time the microswitch is opened by the arm 102, rendering the distributor entirely inoperative. Turning the knob 101 to "On" position rotates the member 93 to move the rotor head back into contact with the points 82 and simultaneously closes the microswitch 103 to restore the distributor to operativeness.

Figure 11:
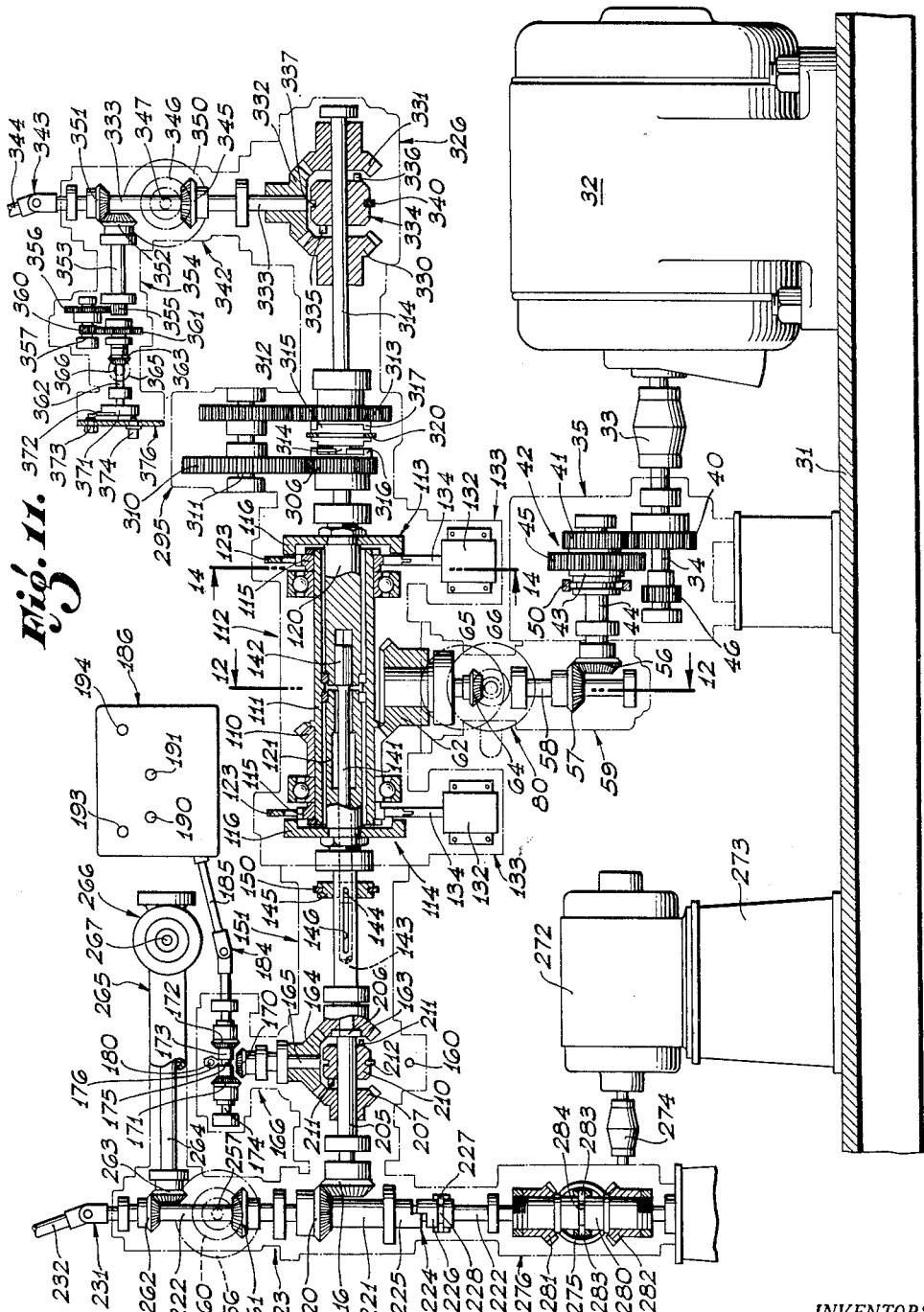
Figure 11 is a phantom view of the machine, showing the power transmission means for driving the several parts.

Returning now to the transmission mechanism illustrated in Fig. 11, the bevel gear 62 at the top end of the vertical drive shaft 58 meshes with a mating bevel gear 110 which is fitted over and secured to a tubular shaft 111 of relatively large diameter which is journaled in suitable bearings in a housing 112. At opposite ends of the tubular drive shaft 111 are single revolution clutches 113 and 114 which are operative to drive the camera and projector, respectively, and which are utilized independently in the making of single-frame exposures, as will be described more fully hereinafter. The clutches 113 and 114 are identical in construction and operation; hence only the right-hand or camera clutch 113 will be described, it being understood that each part shown and described in clutch 113 has its counterpart in clutch 114. The clutch 113 is best shown in Fig. 14 and consists of a driving member 115 fixed to the end of the tubular drive shaft 111, and a driven member 116 fixed to a shaft 120 which is concentric with the tubular drive shaft 111 and extends into the central bore therein. In the case of the clutch 114, the driven member 116 is fixed to a shaft designated by the reference numeral 121, which likewise extends into the hollow bore of the tubular drive shaft 111. Pivoted at 122 on the face of driven member 116 is a semi-circular latch 123 having a dog tooth 124 projecting radially inwardly from its inner surface at a point intermediate its ends. The dog tooth 124 is adapted to be engaged by a shoulder 125 on the periphery of the driving member 115 so that the members 115 and 116 of the clutch are made to rotate together. The latch 123 is yieldingly urged toward the driving member by a spring 126 which is anchored to the driven member. The latch 123 is adapted to be disengaged from the shoulder 125 of the driving member by the action of a pawl 130 which is pivoted at 131 on the housing 112. The pawl 130 is actuated by a solenoid 132 mounted on the back of a bracket 133 projecting downwardly from the bottom of housing 112. The plunger 134 of the solenoid extends through an opening 135 in the housing and is connected at 136 to the pawl 130 so that the latter is swung counterclockwise, out of the way of the free end 140 of the latch 123 when the solenoid 132 is energized. When the pawl 130 is held out of the path of the latch 123 by the solenoid 132, the clutch is engaged, and when the pawl 130 is released by the solenoid, it engages the end 140 of the latch 123, lifting the dog 124 clear of the shoulder 125 to disengage the driven member from the driving member.

The projector drive shaft 121 is adapted to be engaged with the camera drive shaft 120 to be driven in synchronism therewith by means of a rod 141 which is slidably disposed within the shafts 121 and 120 on the axis thereof. The end portion 142 of the rod 141 is square in cross-section and somewhat larger across the diagonal than the diameter of the rod, said end portion being received within close-fitting square sockets formed in the adjacent ends of shafts 121 and 120. When the square ended portion 142 of the rod is engaged in the socket in shaft 120, the camera and projector drive shafts are joined together and rotate as one, with the power being transmitted from the tubular drive shaft 111 to the shafts 120 and 121 through the camera clutch 113. When the square end 142 of the rod is retracted entirely into the shaft 121, however, the shafts 121 and 120 are disconnected from one another, permitting either the camera or projector to be driven from the tubular drive shaft 111 independently of the other through their respective clutches 113 and 114. This independent actuation of the clutches 113 and 114 is accomplished by means of the solenoids 132 which are controlled through either manually or automatically operated relays, as will be described more fully presently. The round shank portion of rod 141 extends to the left of the clutch 114 into a cylindrical central bore 143 formed in shaft 121 and is connected at its end by a pin 144 to a circumferentially grooved shift collar 145 which is slidably mounted on the outside of shaft 121. The pin 144 passes through axially extending, elongated slots 146 which are formed in the side walls of the shaft 121 at diametrically opposite points thereon, enabling the rod 141 to be shifted axially by means of the shift collar 145 on the outside of shaft 121. The groove in the collar 145 is engaged by a shift fork 150 which is slidably supported within a housing 151 mounted on the left hand end of housing 112. Fork 150 is operatively connected to a shaft 152 (see Fig. 2) to be shifted thereby when the shaft is turned. The shaft 152 projects through the front wall of housing 151, and fixed to its outer end is a lever 153 which is connected by a push rod 154 to a lever arm 155. The lever arm 155 is fixed onto a sleeve 156 which fits over and is journaled on a rod 160 extending forwardly from the housing 151, both sleeve 156 and rod 160 projecting through the panel board 30. An interlock shift lever 161 is fixed onto the outer end of the sleeve 156, and is movable between the "In" position shown and the "Out" position indicated at 162.

Fixedly mounted on the projector drive shaft 121 to the left of shift collar 145 is a bevel gear 163 which meshes with a second bevel gear 164 on a vertical shaft 165 projecting upwardly therefrom and journaled in suitable bearings in a housing 166. The shaft 165 has a bevel gear 170 fixed to its upper end which is adapted to mesh with either of two bevel gears 171 and 172 formed integrally on a common hub 173. The hub 173 with gears 171 and 172 is slidably mounted on a horizontal shaft 174 which is journaled in housing 166 and is keyed or otherwise secured thereto so as to drive the shaft. A circumferential groove 175 is formed in the hub 173 between gears 171 and 172 and is engaged by a shift fork 176 which is suitably mounted in the housing for sliding movement parallel to the axis of shaft 174. The shift fork 176 is operatively connected to a shaft 180 in a manner whereby rotation of the shaft 180 causes shift fork 176 to slide the hub 173 along its shaft and thereby bring either of the gears 171 and 172 into mesh with gear 170 to drive shaft 174 in one direction or the other. Shaft 180 projects forwardly from the housing 166 through the panel 30 and has a lever arm 181 fixed to its front end. As shown in Figs. 1 and 3, the shift lever 181 and its associated gears are in neutral position, with neither of gears 171 or 172 in mesh with gear 170. The forward and reverse positions of shift lever 181 are indicated at 182 and 183, respectively.

The horizontal drive shaft 174 projects from the right-hand end of housing 166 and is connected by a universal joint 184 and shaft 185 to a multiple speed gear box 186. The gear-box 186 has two laterally spaced output shafts 190 and 191 projecting forwardly through the front wall thereof, these shafts being provided at their front ends with suitable means permitting a power take-off shaft 192 to be coupled selectively to either one or the other of the shafts. In Fig. 1 the power take-off shaft 192 is shown connected to the right hand output shaft 191. Any conventional arrangement of gearing mechanism may be used in the gear-box 186, the one shown being characterized by a wide selection of output speeds available at the two shafts 190 and 191. Change of gear ratio is effected through the agency of suitable shifting mechanism actuated by rotation of either one or both of shafts 193 and 194 projecting forwardly from the gear-box 186 and having dials 195 and 196 on their front ends, respectively. Each of the dials 195 and 196 gives a plurality of gear ratios, and for any given setting of such dials, two different output speeds are available at the shafts 190 and 191. Hence the various combinations of dial settings together with the corresponding speeds available at shafts 190 and 191 give a wide selection of driving speeds for the power take-off shaft 192.

The power take-off shaft 192 includes a right angle drive 200 at the lower end thereof with suitable means for connection to the shafts 190, 191. The right angle drive 200 is connected by a universal joint 201, splined telescopic shaft 202, and universal joint 203 to a second right angle drive 204 at the upper end thereof which also includes coupling means for attachment to the several available accessory units, such as the wipe-off device 24, or to the drive shaft of the automatic "zoom" mechanism, to be described more fully hereinafter.

Returning now to the projector drive, there is a shaft 205 journaled in the housing 151 coaxial with shaft 121 and forming an extension thereof to the left of bevel gear 163. The right-hand end of shaft 205 is journaled in a pilot bearing 206 in the hub of bevel gear 163, and journaled on said shaft across from the bevel gear 163 is a bevel gear 207 which is in constant mesh with bevel gear 164. The projector drive shaft 205 is adapted to be driven in either forward or reverse direction by means of a clutch 210 which is keyed or otherwise slidably and nonrotatably secured on the shaft. Projecting axially from the clutch 210 at opposite ends thereof are spring-pressed pins 211 which are adapted to be received within corresponding holes formed in the ends of gears 163, 207, to connect one or the other to the shaft 205 to drive the latter. The clutch 210 is provided with a circumferential groove around its periphery which is engaged by a shift fork 212. The shift fork 212 is operatively connected in a suitable manner to the rod 160 and is shifted from one position to the other by rotation of said rod. As pointed out previously, the rod 160 extends forwardly from housing 151 and serves as a support for sleeve 156 to which the interlock shift lever 161 is attached. The rod 160 projects outwardly beyond the end of sleeve 156 and has an upwardly extending lever arm 213 attached thereto. The lever 213 is the control for shifting the projector into forward, neutral, or reverse drive; and as shown in Figs. 1 and 11, the projector drive is in neutral, the forward and reverse positions being indicated on the dial at 214 and 215, respectively.

Mounted on the left-hand end of shaft 205 is a bevel gear 219 which meshes with a bevel gear 220 fixed to a sleeve 221, the latter being rotatably carried on a shaft 222. The shaft 222 is journaled in suitable bearings in a housing 223 and extends from the top end to the bottom end thereof. The sleeve 221 is adapted to be connected to the shaft 222 to drive the latter through the agency of a clutch 224, comprising a member 225 fixed to the bottom end of sleeve 221, and a companionate member 226 which is slidably keyed to the shaft 222. The sliding clutch member 226 is shifted into and out of engagement with member 225 by means of a shifting fork 227 which engages a circumferential groove 228 in member 226 and which is actuated by a solenoid mechanism (not shown) mounted on the back of housing 223. During normal operation of the machine, the clutch member 226 is held into engagement with member 225 by a spring (not shown) acting on the shifting fork 227, said member 226 being disengaged from member 225 by the operation of the solenoid which is energized when a "sync. relay" button 230 on the instrument panel is pressed.

The upper end of the shaft 222 projects through the end of housing 223 and is connected by a universal joint 231 to a shaft 232 which is connected, in turn, by a universal joint 233 to the drive shaft 234 of the projector 21. The operating mechanism of the projector is more or less conventional and is contained within a housing 235 which includes film magazine chambers 236 and 237 at the upper and lower ends thereof. The housing 235 is mounted on a bed 240 which is slidable along a horizontally disposed dove tail way 241 which is slidable, in turn, along a vertical dove tail way 242 mounted on the side of the housing 20. Hand wheels 243 and 244 are suitably geared to the bed 240 and way 241, respectively, so as to provide means for adjusting the projector laterally and vertically with respect to the optical axis of the objective lens 23.

Disposed to the left of projector housing 235 is a lamp housing 245 which is mounted on a bracket 246 on the machine housing. The lamp housing 245 contains the usual projection lamp 250, reflector, and condensing lenses (not shown) with adjusting knobs 251 and 252 for adjusting the positions of the reflector and lamp, respectively. Cooling air for the lamp is forced through the housing 245 by an electrically driven blower 253 which is mounted on the bracket 246 below the housing 245. The intensity of the light produced by the projection lamp is controlled by a voltage regulator 254 (see Fig. 2) which is adjusted by a control knob 255 on the panel.

Manual operation of the projector for the purpose of threading film through the mechanism, or for moving film slowly through the projector independently of the camera to select a particular frame as a reference point on which the camera and projector are synchronized in producing certain special effects, is accomplished by means of a projector framing knob 256 which is mounted on a shaft 257 extending into the housing 223. Fixed to the inner end of the shaft 257 is a bevel gear 260 (see Fig. 11) which is adapted to mesh with a bevel gear 261 mounted on the shaft 222 above gear 220. The shaft 257, with gear 260, is slidably arranged within the housing and is normally urged outwardly by a spring (not shown) so that the gear 260 is held out of mesh with gear 261. The gears are meshed by pressing the knob 256 inwardly against the pressure of the spring, which moves gear 260 into engagement with gear 261. Manual operation of the projector is usually done with the clutch 224 disengaged so that the operator is not required to turn the motor and camera mechanism with the knob.

Mounted on the shaft 222 above gear 261 is a bevel gear 262 which meshes with a bevel gear 263 affixed on a horizontal shaft 264 which is journaled in suitable bearings in a housing 265. At the right-hand end of the housing 265 is a right angle drive 266 having a forwardly projecting drive shaft 267 which is operatively connected to a projector frame counter 270 on the instrument panel. A resetting knob 271 is provided alongside the frame counter window which enables the counter to be set back to zero at the beginning of a printing run.

Rewinding of the film in the projector is accomplished rapidly and easily by means of a variable speed, universal rewind motor 272 mounted on a platform 273 on the shelf 31 and operatively connected to the projector mechanism through transmission means which will now be described.

The shaft of the motor 272 is connected by a flexible coupling 274 to a worm and gear set (not shown) which drives a bevel gear 275 journaled in a housing 276. On the lower end of shaft 222 is a sleeve 280 having opposed bevel gears 281 and 282 integrally mounted thereon on opposite sides of the gear 275. The sleeve 280 is keyed or otherwise slidably and nonrotatably connected to the shaft 222, enabling the gears 281 and 282 to be selectively meshed with gear 275. Shifting of gears 281 and 282 is accomplished by means of a fork 283 which engages a circumferential groove 284 in the sleeve 280 midway between the gears. The shifting fork 283 is moved axially along the shaft 222 by means of an operating rod 285 with which it is connected by a cam and roller arrangement (not shown), said cam and rollers providing the requisite axial movement of gears 281, 282 to secure full engagement in either direction with gear 275 during approximately the first 15 degrees of rotation of the rod 285 on either side of neutral, and continued rotation of said rod producing no further axial movement of gears 281, 282. The rod 285 projects through the front wall of housing 276 and has a downwardly extending lever arm 286 fixed to its outer end. The arm 286 is connected by a push rod 287 to one arm of a bell crank 290, the other arm of said bell crank being connected by a second push rod 291 to an arm 292 mounted on a sleeve 293 which is journaled on a shaft 294 mounted on a transmission housing 295 of the mechanism. The sleeve 293 projects forwardly through the panel 30 and has a gear shift lever 296 fixed to its outer end. Thus, movement of the gear shift lever 296 is transmitted to the lever 286 through the interconnecting linkage to shift the sleeve 280 up or down on shaft 222 and thereby engage either gear 281 or 282 with gear 275 to drive the projector mechanism in forward or reverse, as the case may be. Arm 286 also acts as a contact arm, carrying current from the line to the rewind motor 272 through contacts 300, 301, and 302. These contacts are connected to resistors 303, 304, and 305 (see circuit diagram of Fig. 18), which are interposed in series between the line and motor 272, and their function is to vary the speed of the motor by varying the voltage across the motor terminals. As pointed out previously, the cam and roller arrangement between the rod 285 and the shifting fork 283 is such that the gears are fully meshed during approximately the first 15 degrees of rotation of the operating rod 285 on either side of neutral position, which is approximately the spacing of the first contacts 300, and that additional rotation of the rod 285 to permit arm 286 to reach the other contacts 301 and 362 is accomplished without further axial movement of the gears.

Turning now to the transmission mechanism for driving the camera, the driven member 116 of stop-motion clutch 113 is fixedly connected to the shaft 120 which projects to the right of the clutch. Journaled on the shaft 120 within the housing 295 is a gear 306 which meshes with a larger gear 310 fixed to a shaft 311. The shaft 311 is journaled in the housing 295 and parallel to shaft 120, and has a second gear 312 of somewhat smaller diameter mounted thereon which meshes with a larger gear 313 journalled on a shaft 314. Shaft 314 is coaxial with shaft 120 and runs in a pilot bearing (not shown) in the end of the latter. Slidably keyed to shaft 314 is a clutch member 315 having dogs on either side thereof which are engageable with complementary clutch elements 316 and 317 on adjacent faces of the gears 306 and 313, respectively. The clutch member 315 is shifted into engagement with either of the elements 316 or 317 by means of a fork 320 which is suitably connected to the shaft 294 mentioned earlier. Fixed to the shaft 294 between the end of the sleeve 293 and the housing 295 is an upwardly extending arm 321, the outer arm of which carries a link 322 which is connected to another arm 323 fixed to a sleeve 324. The sleeve 324 is held on a shaft 325 which projects from the face of a housing 326, and both the sleeve 324 and shaft 325 project through the panel 30. Mounted on the outer end of the sleeve 324 is a downwardly extending shift lever 327 which is manually operable to shift the gears in box 295 to obtain normal or half speed camera drive. The lever 327 is movable between two reference points designated "N" (for normal speed) and "S" (for slow speed) as shown in Fig. 1.

Shaft 314 projects beyond gear box 295 and into housing 326, being supported in suitable bearings in the latter. Journalled on shaft 314 are two axially spaced, inwardly facing bevel gears 330 and 331 which are in constant mesh with a third bevel gear 332 mounted on the lower end of a vertical shaft 333. The gears 330 and 331 are adapted to be selectively locked to the shaft 314 to be driven thereby through the agency of a sliding clutch member 334 which is keyed or otherwise slidably and non-rotatably connected to the shaft 314 between the gears. Projecting axially from opposite faces of the clutch member 334 are spring-pressed dogs 335 and 336 which are adapted to drop into corresponding holes in the webs of their respective gears. The clutch member 334 has a circumferential groove 337 which receives a shifting fork 340, the latter being operatively connected to the shaft 325 whereby rotation of the shaft causes the clutch member to be shifted axially along the shaft 314. Fixed to the outer end of the shaft 325 and on the outside of lever 327 is an upwardly extending shift lever 341. As shown in Fig. 1, the lever 341 is movable between three positions designated "F," "N," and "R," representing "forward," "neutral" and "reverse," respectively.

The shaft 333 extends upwardly through a housing 342 and projects from the top end thereof, being connected at its upper end by a universal joint 343 to a telescopic camera drive shaft 344. Fixed to the shaft 333 at about its midpoint is a bevel gear 345 which is engageable by another bevel gear 346 fixed to a shaft 347. The shaft 347 projects through the wall of housing 342 and through the panel 30 and has a hand-framing knob 350 affixed to its outer end. The shaft 347 with its gear 346 and knob 350 is spring-biased away from the bevel gear 345 and out of engagement therewith. Gear 346 is made to mesh with gear 345 by pressing the knob 350 inwardly against the pressure of the spring, and when the gears are thus meshed the camera mechanism can be turned over slowly by hand to facilitate threading the film through the mechanism or to enable the operator to move the film through very slowly, as when it is desired to locate a particular frame.

Also fixed to the shaft 333 near the upper end thereof is another bevel gear 351 which meshes with a companionate gear 352 mounted on a horizontally extending shaft 353. The shaft 353 is journalled in suitable bearings in a housing 354 and has a small pinion 355 fixedly mounted thereon which meshes with a large gear 356 mounted on a countershaft 357. The countershaft 357 is positioned above the shaft 353 and parallel thereto, and also has a small pinion 360 which meshes with a larger gear 361 which is fixedly mounted on a shaft 362. Shaft 362 is coaxial with shaft 353 and is likewise journaled in the housing 354. The tooth ratios of pinion 355 to gear 356, and of pinion 360 to gear 361 are such as to give a speed reduction of 16 to 1 at shaft 362 with respect to shaft 353, whereby shaft 362 makes one complete revolution for each 16 frames or one foot of film passing through the camera.

Fixed to the shaft 362 just beyond gear 361 is a bevel gear 363 which drives the total film footage counter, indicated at 364 in Fig. 1, through a bevel gear 365 mounted on the rear end of a shaft 366. The function of the counter 364 is to keep track of the total footage of film run through the printer over any given period of time. Also driven from the shaft 366 through a pair of companionate bevel gears (not shown) is a second shaft 370 (see Fig. 2) projecting perpendicularly upward and operatively connected to a scene frame and footage counter 369 which is mounted on the cabinet immediately below the camera and which is used for timing the beginning and ending of special effects or for synchronizing the several elements to take effect on a particular frame, as well as for timing the length of a scene.

Mounted on the outer end of the shaft 362 is a distributor head 371 having a spring finger 372 which sweeps over sixteen contacts 373 arranged in a circle about the axis of shaft 362 and spaced equidistantly apart. Electrical current is fed into the distributor head through a contact 374 which runs on a continuous conductor connected to the finger 372. The function of the distributor, which is designated in its entirety by the reference numeral 376, is to energize a switch panel 378 and in cooperation with the switches thereon, to actuate the stop motion relays (to be described later) which control the solenoids 132, or to sound a buzzer which serves as an audible frame counter, enabling the operator to keep track of the number of frames or the number of feet of film passing through the camera. To this end, the sixteen contacts 373 of the distributor 376 are connected in orderly sequence one to each of the sixteen switches on the panel 378, and these switches are connected, in turn, to a selector switch 380 having stations marked "Off," "Projector Start," "Projector Stop," "Both Stop," "Camera Stop," and "Buzz." There is still another switch 381 designated "Auto Stop" which is serially connected to the selector switch 380 and which functions to energize the switch panel 378 at a given moment, so that said switch panel can be rendered inoperative until a certain footage of film has been run through the machine and then made operative by pressing the switch button 381. Thus, the machine can be made to stop or start on any given frame of film within a range of one foot (sixteen frames) of film by merely closing the switch on panel 338 corresponding to the desired frame, and then pressing the "Auto Stop" button 381 when the footage counter 364 indicates that the desired frame is within one foot of the camera gate. As the selected switch is reached by the distributor, current passing through the circuit energizes a holding coil on the relay of one of the solenoids 132, causing the solenoid to engage or disengage its associated clutch 113 or 114 and to hold the same in its new position. When the selector switch 380 is on "Buzz," the buzzer is sounded for each closed switch on panel 378 as it is reached by the distributor, hence by closing all of the switches, the buzzer sounds for each frame of film passing through the camera, or by closing alternate switches, the buzzer sounds for every other frame. The electrical circuit for accomplishing the above effects and the mode of its operation will be described in more detail presently.

Returning now to the camera drive, the upper end of the telescopic camera drive shaft 344 is connected through a universal joint 383 to the camera drive shaft 384. The operating mechanism of the camera is more or less conventional and therefore need not be described in more detail here. It may be stated briefly, however, that the camera mechanism consists of the usual rotary shutter, with a dissolve shutter control 385 for regulating the size of the shutter opening and thereby governing the time of exposure. The mechanism also includes the usual pawls for pulling the film past the gate, and registration pins which are engageable with the perforations in the side of the film to hold the film absolutely stationary during the exposure.

Both the camera 22 and the objective lens 23 are supported on the machine for independent sliding movement along the optical axis toward and away from the projector. Movement of the lens toward or away from the projector aperture has the effect of respectively increasing or decreasing the size of the image at the camera aperture, while simultaneous movement of the camera with respect to the lens is necessary to maintain the image in focus at the camera aperture. The reason for this is that for each position of the lens with respect to the projector aperture there is a corresponding focal plane at which the camera aperture must be positioned if the image is to be in focus. As the lens is moved closer to the projector, the camera must be moved back away from the lens and, conversely, as the lens is moved away from the projector, the camera must be moved toward the lens. This relative shift of the objective lens with respect to the projector, and of the camera with respect to the objective lens, is illustrated in Figs. 9 and 10. In Fig. 9, the objective lens is located in its normal position substantially midway between the projector and camera apertures, and the image at the camera aperture is exactly the same size as the image at the projector aperture. It will be noted that the distance A from the optical center of the objective lens 23 to the gate of the projector is exactly the same as the distance B to the camera gate. In Fig. 10, however, the objective lens has been moved up closer to the projector to give a magnified image at the camera, while the camera has been moved back from its original position so that the total distance A' plus B' is greater than the distance A plus B. The condition shown in Fig. 10 is illustrative of the set-up used in making 35 mm. prints from 16 mm. film, or where it is desired to improve the composition of the original picture by enlarging only a portion of it up to the full size of the frame at the camera. The making of zoom shots in the optical printer is based upon the progressive shifting of the objective lens relative to the projector and of the camera relative to the lens, and results in a gradual enlargement of the center of interest on the film, giving the same effect as though the camera had been moved up to closer range. The simultaneous movement of the objective lens 23 and camera 22 in the precise relationship required is effected through a hand wheel 390 on the front of the machine just below the objective lens. The hand wheel 390 is mounted on the end of a shaft 391 and, as shown in Fig. 6, is adapted to be locked against rotation by means of a cone clutch 392 which is engageable with a stationary companionate clutch element 393 on the housing. The clutch element 392 is fixedly attached to the handwheel 390 and is slidably keyed to the shaft 391 so that it can be drawn up tight into element 393 by means of a locking wheel 394 which is threaded onto the end of the shaft 391 and bears against the end of the hand wheel 390. The inner end of the shaft 391 is supported within bearings carried by a bracket 395 depending from the top of the machine housing. Fixed to the inner end of the shaft is a worm 396 which meshes with worm gears 397 and 398 at the top and the bottom thereof. The lower gear 398 is mounted on a shaft 400 extending lengthwise of the machine and journalled in suitable bearings in the bracket 395. The right hand end of the shaft 400 is connected to the end of a coaxial shaft 401 by an adjustable backlash take-up coupling 402 of the type providing for a limited amount of lost motion between the shafts 400 and 401. This lost motion allows the backlash in the train of gears driving the objective lens carriage to be taken up before the shaft 401 starts turning, so that the camera and lens will always move in unison, with neither lagging behind the other. Such backlash take-up couplings are well-known in the art and therefore need not be described in detail here. The shaft 401 is journalled adjacent the coupling 402 in a supporting structure 403 which is fixed to the under side of the cabinet top and depends therefrom. Beyond its bearing support, the shaft 401 extends into the open and is screw-threaded at 404. The opening into which the screw-threaded end of the shaft projects is formed by the provision of a slot 405 extending parallel to the shaft 401 and opening through the bracket 403 from front to back. Dovetailed ways 406 are formed on the front side of bracket 403 above and below the slot 405, and slidably mounted on these ways is a carrier 410 having a boss 409 projecting rearwardly from its back side into the slot 405. The boss 409 has a screw-threaded aperture therein which receives the screw shaft 404. Fixed to the front face of the carrier 410 is a plate 411 having a curved cam slot 412 formed therein, which is adapted to receive a cam follower 413 carried at the end of one arm 414 of a bell crank 415. The cam follower 413 is preferably in the form of a roller journaled on a pin or stub shaft 416 which is secured in any suitable manner in the end of the bell crank arm 414. The bell crank 415 is pivotally supported on a pin 420 which is pressed into a hole in one arm of a U-shaped hanger 421, said hanger being bolted or otherwise attached to the under side of the cabinet top and extending downwardly therefrom and underneath the frame 403 to a point of connection on the back side of the frame along the bottom edge thereof.

The other arm of the bell crank, designated by the reference numeral 422, extends upwardly from the pin 420 substantially at right angles to arm 414 and is connected at its upper end to a link 423, the latter being connected, in turn, to a bracket 424 fixed to the bottom of the camera 22 and projecting downwardly therefrom through a slot 425 in the top of the cabinet. The camera is mounted on a bed 426 which slides on a dovetailed way 430 fixed to the top of the cabinet.

From the foregoing description, it will be seen that rotation of the hand wheel 390 causes the screw-threaded shaft 404 to turn and, through the agency of the boss 409 which functions as a nut, moves the carrier 410 along the ways 406. The cam and linkage connecting the carrier 410 to the camera causes the latter to be moved in a non-uniform manner whereby the camera aperture is maintained precisely at the focal plane of the lens while the latter is moved forwardly at a uniform rate towards the projector by a gear train which will be described presently. Thus, the shape of the cam slot 412 is determined by a variation in the image distance for each increment of travel of the lens, and by the geometry of the bell crank. Hence, if it is desired to use a lens of different focal length than the one for which the cam slot 412 was designed, it is necessary to replace the plate 411 with another having a cam slot of appropriate form, and for this reason the plate 411 is detachably secured to the carrier 410.

The objective lens 23 is moved along its optical axis simultaneously with the camera 22 but in the opposite direction therefrom by means operatively connected with the hand wheel 390, the drive for such means being taken from the gear 397. The gear 397 is fixedly mounted on a shaft 431 which is journalled in the bracket 395 parallel to the line of travel of the lens, and also fixed to the shaft 431 alongside gear 397 is a pinion 432 which meshes with an idler gear 433 (see Fig. 6). Idler 433 is mounted on the end of a short shaft 434 which is journalled in bracket 395 and said idler meshes with a third gear 435 lying directly in front of it and fixedly mounted on the right hand end of a shaft 436. Shaft 436 is likewise journalled in bracket 395 and projects outwardly therefrom to the left, said projecting portion being screw-threaded at 440. The objective lens 23 is carried on a bed 441, and bolted to the bottom side thereof is a downwardly extending head 442 which projects through a slot 443 in the top of the cabinet. The head 442 has a screw threaded aperture therein which receives the threaded portion 440 of the shaft. The bed 441 is slidably mounted on dovetailed ways 444 which are formed on a base plate 445 fixed to the top of the cabinet. Fixed to the top of the bed 441 is a member 446 having a dovetailed groove 450 extending from the front to the rear of the machine, and slidably disposed in this groove is a companionate member 451. The member 451 is moved with respect to the member 446 by means of a hand wheel 452 fixed to the front end of a fore and aft extending shaft 453, said shaft being journalled in a bracket 454 fixed to and extending upwardly from the front edge of member 451. The shaft 453 extends into a recess 455 formed in the bottom of member 451 and has a threaded portion (not shown) which is threaded through a nut 456 bolted to the top of member 446. At the back end of member 451 is an upwardly extending post 460 having vertical dovetailed ways 461 on which is slidably mounted a carrier 462. The carrier 462 is moved vertically on the ways 461 by means of a hand wheel 463 which is journalled in the bracket 454 above wheel 452, said wheel 463 being fixed to the outer end of a shaft 464 which extends rearwardly through a tube 465 and has a bevelled gear 466 fixed to its rear end. The bevelled gear 466 is meshed with another bevelled gear 470 which is fixed to the lower end of a vertical shaft 471 journalled in suitable bearings within a slot 472 formed in the post 460. The shaft 471 has a threaded portion which is engaged by a nut 473 bolted on the bolt of the carrier 462. In this way the carrier 462 can be raised or lowered by turning the hand wheel 463.

Formed in the front face of the carrier 462 is a dovetailed groove 474 extending parallel to the optical axis of the lens, and slidably mounted in this groove is a carrier 475 to which the barrel 476 of the lens is secured by a bracket 480. The lens is movable along the way 474 by means of a manual focus knob 481 which is fixed to a shaft 482 journalled in suitable bearings in the carrier 462. At the rear end of the shaft 482 is a worm gear 483 (see Fig. 8) which meshes with a gear 484 fixed to a vertical shaft 485 journalled on the carrier 462. Also fixed to shaft 485 above gear 484 is a pinion 486 which meshes with a rack 490 on the carrier 475. This arrangement enables the lens to be moved along its optical axis without moving the entire carriage, and is used primarily for out-of-focus effects or for focusing objective lenses of different focal lengths where the machine is to be used for straight printing only, and the synchronized movement of lens and camera is not needed. An index mark 491 is provided on the lens bracket 480 and this cooperates with a scale 492 affixed to the top edge of the carrier 462 to indicate the position of the lens at any time, enabling the operator to duplicate exactly a particular effect or to divide the lens movement into a given number of equally spaced or progressively increasing steps for a certain number of film frames. The index scale 492 also provides the operator with a quick check on the lens focus, enabling him to see at a glance whether the lens has been inadvertently moved out of adjustment without necessitating frequent visual inspection of the image.

A pair of indicator dials 493 and 494 are also provided to indicate the position of the lens in a vertical direction or laterally with respect to the optical axis, said dials being of the type having a spring-pressed plunger projecting downwardly from the base of the indicator and which, when pressed inwardly, produces a reading on the dial. Each of the dials 493 and 494 is mounted on a bracket 495 which is fixed to the post 460. The downwardly extending plunger 496 of dial 494 has a rack 500 fixed to the lower end thereof, said rack extending down through a hole in the top of the small housing 501 mounted on the side of member 451 and being slidably supported in suitable guides therein. The rack 500 meshes with a pinion 502 which is journalled in the housing 501 and this pinion also meshes with a second rack 503 which is also slidably supported in guides within the housing. The rack 503 extends horizontally along the side of member 446 and is fixedly secured at its front end to a bracket or lug 504 projecting outwardly from the side of said member. Adjustment is provided between the rack 503 and the lug 504 to permit adjusting the dial indicator 494 to a zero reading when the lens is on the optical axis. From the foregoing description, it will be seen that this arrangement causes the dial 494 to indicate the lateral displacement of the lens from the optical printer, since the rack 503 is held stationary by the lug 504 while the housing 501 moves laterally with the lens carriage, causing the pinion 502 to roll along the rack and thereby move the rack 500 up or down. In the preferred arrangement, the dial 494 gives a reading directly in thousandths of an inch.

Vertical displacement of the lens is indicated on dial 493 which is also mounted on the post 460. Fixed to the lower end of the plunger of the dial is an extension 505 (see Fig. 8), the lower end of which is engageable by a bracket 506 fixed to the back of carrier 462 and extending rearwardly therefrom. Vertical movement of the lens with the carrier 462 thus causes the bracket 506 to press upwardly on the plunger 505, causing the dial to indicate the position of the lens.

When the lens and camera are moved apart to obtain an enlarged image at the camera aperture, as in Fig. 10, the distance from the lens to the image plane is increased, and if the iris diaphragm of the lens is allowed to remain constant the effective f-value of the lens will decrease, resulting in decreased brilliance of the image. This condition results from the well-known fact that the brilliance, or light passing ability of the lens is inversely proportional to the square of its f-value, the f-value being defined as the ratio of the distance between the center of the lens and the image plane, to the diameter of the iris opening. Thus, if the distance to the image plane is increased while the diameter of the iris opening remains constant, the numerical ratio expressing the f-value of the lens is increased and the brilliance of the lens is correspondingly reduced.

The scale on the iris ring is calibrated in f-numbers based on the image distance when the lens is focused at infinity, hence any variation in the image distance results in a true f-value different from that indicated on the scale. Heretofore it has been necessary to compensate for this change in f-value by measuring the distance from the lens to the camera aperture and then computing the f-value by multiplying the indicated f-value with a correction factor. This procedure is time consuming and subject to human error, and in the case of zoom shots, such calculations must be made continuously from beginning to end.

The present invention eliminates all of these difficulties by providing means for automatically varying the diameter of the iris opening as the camera and lens are moved apart. Such means preferably is in the form of a cam plate 510 which is bolted or otherwise secured to the top of the cabinet behind the base plate 445. The top surface of the cam plate is shaped to provide a wide, sloping ramp extending parallel to the optical axis. The round bottomed end of a plunger 511 rides over the cam 510, said plunger being slidably held in a vertical position within a tube 512 which is held, in turn, by a bracket 513 mounted on the back side of the post 460. A spring (not shown) within the tube 512 engages the plunger 511 and yieldingly urges it down against the cam surface. At its upper end, the plunger 511 is connected by a link 514 to the horizontally extending arm 515 of a bell crank 516, said bell crank being pivotally supported by a bracket 520 fixed on the back of the post 460. The upwardly extending arm 521 of the bell crank is connected at its extremity to one end of a curved link 522 which passes forwardly over the top of the lens supporting structure and is connected at its front end through a laterally projecting spacer 523 to an upwardly projecting arm 524. The arm 524 is integral with a clamping ring 525 which encircles the iris diaphragm ring 526, the latter being rotatable about the axis of the lens barrel 476 to control the size of the iris opening.

From the foregoing, it is seen that as the lens moves forwardly toward the projector, while the camera simultaneously backs away from the lens, the plunger 511 rides up on the cam 510, rocking the bell crank 516 in a counterclockwise direction, as seen in Fig. 6, and, through the agency of the link 522, rotating the iris ring 526 to open the iris to the proper diameter to maintain the f-number of the lens at a constant value. Conversely, as the lens moves back away from the projector and the camera moves forward toward the lens, the plunger 511 follows the cam down, rotating the iris ring to open the iris wider.

The lens barrel 476 is connected to the camera by means of a light-tight telescopic tube 530, the small end of which is connected to the lens barrel by a spherical bearing 531 which is contained within a spherical shell 532 screwthreaded to the end of the lens barrel. The large end of the tube 530 is similarly connected to the outer wall of a prism housing 533 by means of a spherical bearing 534 which is secured to the tube and which is contained within a companionate split spherical shell 535 on the prism housing wall.

The prism housing 533 contains a prism 536 (see Figs. 15 and 16) which is mounted on an arm 540 projecting radially from a sleeve 541. The sleeve 541 fits over a shaft 542 and is secured thereto by a set screw, the ends of the shaft projecting beyond the ends of the sleeve to form trunnions 543 which are journalled in bushings 544 in the back wall and front plate 545 of the prism housing. The front end of the shaft 542 projects beyond the plate 545 and has an operating lever 546 secured thereto by a set screw or the like.

The shaft 542 is drilled through its center, and slidably disposed therein is a push rod 550, one end of which projects beyond the outer end of the shaft 542 and has a button head formed thereon. The other end of the push rod 550 is chamfered off at 551 to form a cam surface which engages the bottom end of a pin 552 to lift the same when the push rod is pressed inwardly. The pin 552 is slidable within a vertical bore 553 in the arm 540, and is engageable at its upper end with one end of a detent 554. The detent 554 is pivoted at 555, and is engageable at the other end thereof with a catch 556 on the prism housing to hold the prism in viewing position.

A spring 560 bears downwardly against the one end of the detent, urging the other end upwardly into engagement with the catch.

The detent 554 is released from the catch by pressing inwardly on the push rod 550, thereby camming the pin 552 upwardly and tripping the detent from the catch. The push rod 550 is urged outwardly by a spring 561 and is limited in its movement by a pin 562 which is secured in the shaft 542 and which passes through a longitudinal slot 563 in the push rod. When the detent is released, the prism arm 540 is pulled down to one side and out of the path of the rays from the objective lens, by means of a spring 564 which is anchored at 565 to the housing. A spring bumper 566 on the housing engages the arm 540 to provide a cushioned stop for the same so that the prism is not jarred or damaged.

Figure 15:
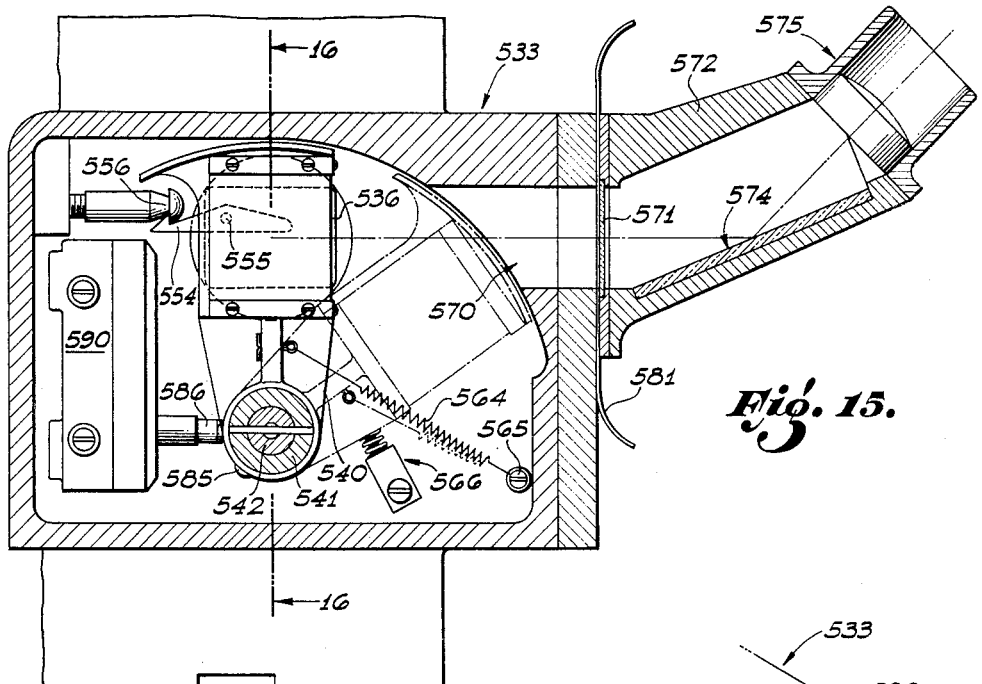
Figure 15 is an enlarged sectional view taken through the viewer along the line 15—15 in Fig. 8.
Figure 16:
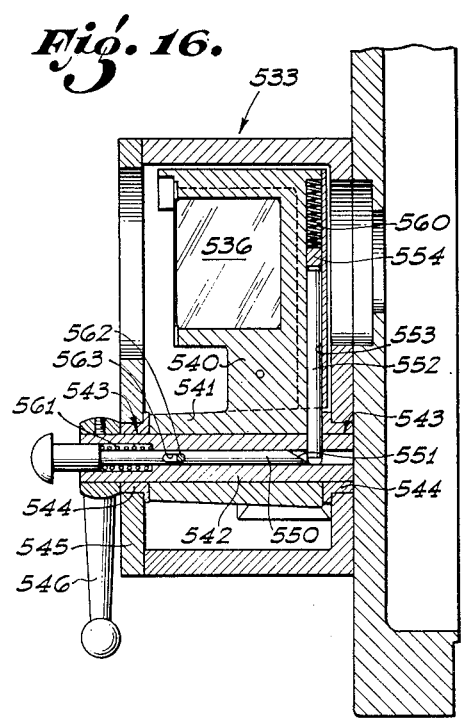
Figure 16 is a sectional view taken along the line 16—16 in Fig. 15.
Figure 17:
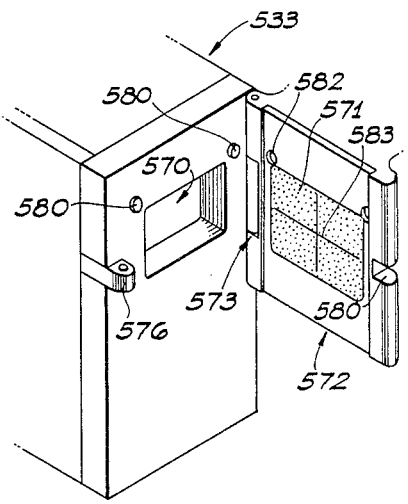
Figure 17 is a fragmentary perspective view of the viewer with the eye-piece mount swung open.

The prism 536 is a conventional 45 degree right triangle prism, arranged so that when it is in the viewing position shown in solid lines in Fig. 15, the image from the lens is reflected at right angles through an aperture 570 in the front wall of the housing onto a ground glass screen 571. The ground glass screen 571 is mounted on a gate 572 which is hinged to the prism housing at 573, said screen being positioned at the same distance from the objective lens as the camera aperture so that the reflected image is focused thereon. Inside the gate 572 is a mirror 574 which reflects the image so that when viewed through an eyepiece 575 the image is right side up. A projection 576 on the housing is received within a slot 580 in the free edge of the gate, there being a spring-pressed ball detent (not shown) in the gate which is engageable with the projection 576 to lock the gate closed.

A pair of locating pins 580 are fixed to the outside face of the prism housing 533 adjacent the two upper corners of the aperture 570 and project therefrom, said pins being adapted to pass through the perforations of a strip of film, indicated at 581 in Fig. 15, to locate a frame relative to the ground glass screen 571 in the exact position occupied by the projected image of a frame in the projector.

The gate 572 is provided with recesses 582 which receive the projecting ends of the pins and allow the gate to close. The ground glass screen 571 has a pair of crossed hairlines 583 inscribed thereon, providing reference points which enable the operator to line up the scenes for any of the several operations requiring double exposures. The sleeve 541 has a button 585 projecting therefrom which is located so as to engage and depress the plunger 586 of a normally open micro switch 590 when the prism is swung down to inoperative position, as shown in broken lines in Fig. 15. When the prism is swung up to viewing position, as shown in solid lines, the plunger 586 is released, closing the micro switch and either stopping the main drive motor 32 if the gears in housing 35 are in high speed condition, or opening the circuits to all controls so that all stop-motion circuits and manual controls for both the camera and projector are rendered inoperative if the gears are in low speed condition.

It might be mentioned, at this point, the same result is had if another switch 591, located inside the camera and known as a film buckle switch (see Figs. 19 and 20) is closed, said switch being closed whenever the film in the camera becomes jammed. The above functions are effected, however, only if a toggle switch 592 is in the "On" position shown in Fig. 19. If the switch 592 is in the "Off" position, the prism micro switch 590 and film buckle switch 591 are by-passed and thus rendered ineffective, but at the same time a red jewel warning light 593 is turned on, indicating to the operator that the switch 592 should be turned to the "On" position before starting to print. The purpose of this arrangement is to provide automatic means for preventing the machine from being inadvertently operated, either when the viewing prism is in the way or when film is jammed in the camera. At the same time, provision is made for over-riding this automatic safety feature to permit the operator to run the machine while viewing the action through the viewing prism, the red warning light being turned on automatically as a reminder that the machine is not in condition for printing. The warning light 593 can also be turned on manually, independent of the switch 592, by means of a toggle switch 594 for the purpose of indicating that the machine is otherwise not in condition to be operated, due to changes of adjustment which may have been made in the optical or mechanical system and which should be restored to their original condition before printing is resumed.

Earlier in the discussion there was a brief description of the electrical distributor 80, the function of which will now be discussed. It was pointed out that the current-carrying finger 81 of the distributor sweeps over twelve equally spaced contacts 82 which are arranged in a circle, and that the rotational speed of the finger is at the rate of one revolution per 12 frames of film. Thus, the finger 81 closes with one of said contacts for each frame of film passing through the camera throughout a 12 frame cycle of operation.

Current from the distributor 80 is transmitted to a switch panel 596 having 12 single pole, double throw, neutral center toggle switches 597 arranged thereon, each of said switches being operative to control the operation of the camera when flipped up to "Camera" position, and to control the operation of the projector when flipped down to "Projector" position. The top terminals of the switches 597 are connected to a common wire 598, while the bottom terminals are connected to a common wire 599, said wires 598 and 599 being connected through circuits, which will be described presently, to the solenoids 132 of the camera and projector, respectively.

The function of the distributor 80 and switch panel 596 is to provide means for automatically operating the stop motion clutches of either the camera or projector or both in any desired sequence within a 12-frame cycle, the camera clutch 113 being engaged for a single revolution so as to effect a single frame exposure when the switch is flipped up to "Camera" position, and the projector clutch 114 being engaged for a single revolution to operate for a single frame when the switch is flipped down to "Projector" position. During such single frame operation of one of the mechanisms, the other mechanism remains stationary, hence film pulled through the projector while the camera is stopped is photographed on the next revolution of the driving mechanism while the projector is stopped, if the switches 597 are flipped alternately up and down. If it is desired to repeat the printing of any given frame, as for example, while making a 24-frame-per-second print from a 16-frame-per-second film, the first, third, sixth, and eighth switches would be flipped down, while the second, fourth, fifth, seventh, ninth, and tenth switches are flipped up, the eleventh and twelfth switches being left in neutral due to the fact that this particular cycle can only be set up for automatic operation with ten switches. As a result of the switch sequence described, every other frame in the projector film is printed twice, giving 24 print frames from 16 of the projector frames. In like manner, any given frame of the projector film can be printed any number of times within a twelve frame cycle by merely flipping the desired number of successive switches up to "Camera" position, thereby causing the camera to continue printing while the projector remains stopped. Alternatively, the camera can be made to skip projector frames in any desired sequence by merely flipping successive switches down to the "Projector" position, in which case film will be pulled through the projector while the camera remains stopped. The skipping of frames in the projector is used primarily to speed up the action, and is usually done by skipping every other or every second frame.

Figure 18:
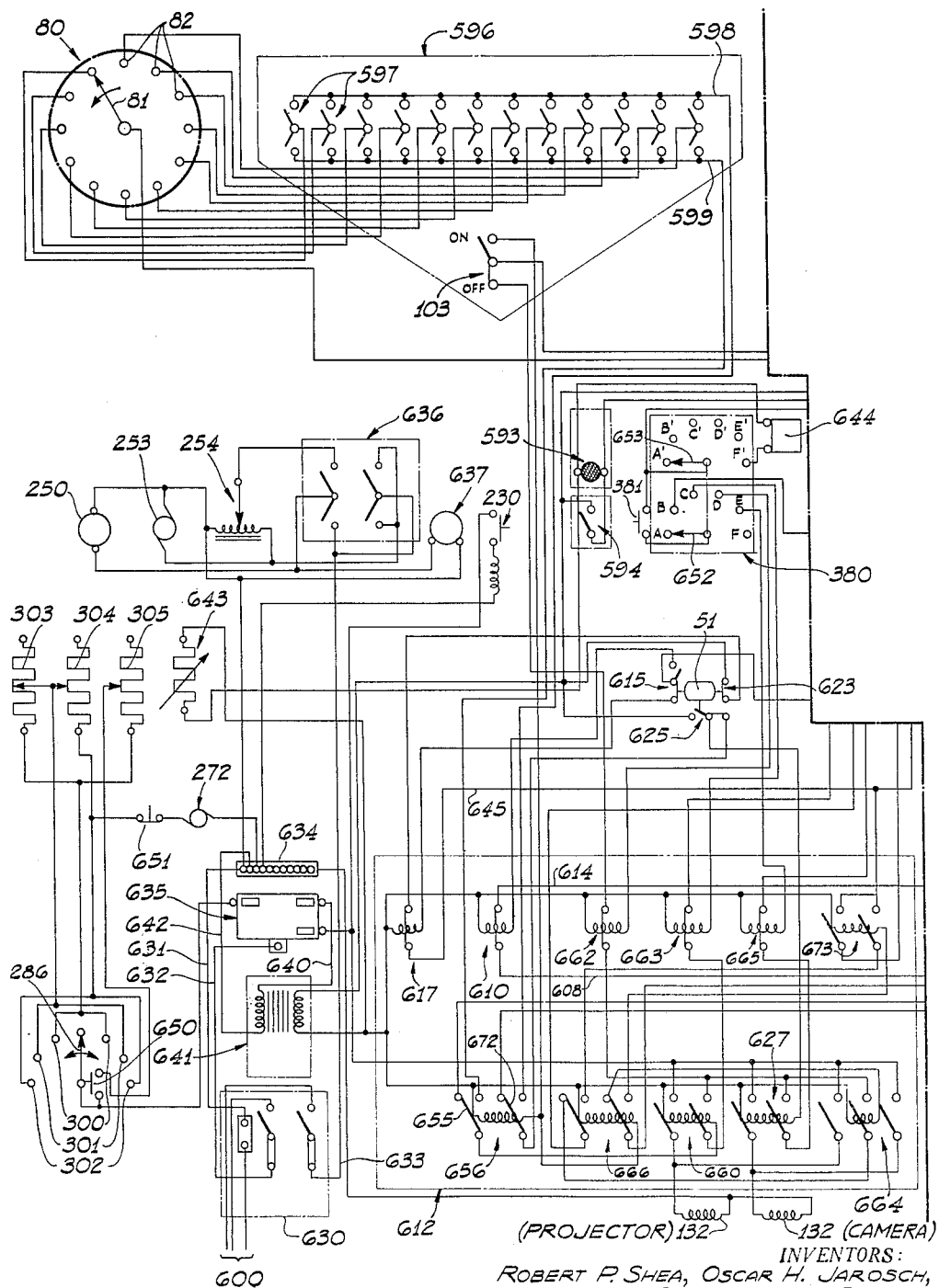
Figure 18 is an electrical wiring diagram of one half of the circuit of the machine.

The electrical circuit for actuating the several mechanisms of the machine is shown diagrammatically in Figs. 18 and 19, while in Fig. 20 the switches, relays, distributors, and other electrical units are shown in the positions that they occupy on the machine. Current for the machine is preferably taken from two line sources 600 and 601; line 600 being 110-220 volt single phase current which is used to run the rewind motor 225 and actuate the several mechanisms, while line 601 supplies 220 volt, 3 phase current to run the main drive motor 32. Wires carrying the 3 phase current from line 601 enter a main power switch 602 located in the base of the machine and which can be operated by removing a panel 603. From the main power switch 602, current is carried to a magnetic starter 604 and thence to a motor speed-changing box 605 having a control knob 606. Wires from the box 605 carry current to the motor 32 which, as mentioned earlier, is a two-speed, three phase, constant speed motor. Leading from the magnetic switch 604 is a wire 608 which is connected to one terminal of a single pole, normally closed relay switch 610 mounted on a relay panel 612 on the back of the machine, the other terminal of said switch being connected by a wire 614 back to the magnetic switch 604. The function of the relay 610 is to open the motor circuit when either the film buckle switch 591 in the camera or the prism micro switch 590 is closed, said switches being connected in parallel and normally open at all times. By thus opening the circuit, the motor 32 is prevented from being inadvertently started when film is jammed in the camera mechanism or when the viewing prism is in the path of the projected image. At the same time, the warning light 593 is lighted up, indicating to the operator that something is wrong at either the prism micro switch 590 or at the film buckle switch 591.

Mounted on the front of the gear housing 35 to the left of the shaft 51 is a single pole double throw microswitch 615, the actuating pin or plunger of which rides on the outside surface of the shaft 51. The shaft 51 has flats formed on opposite sides thereof (see Fig. 18) and functions in the manner of a two-lobed cam, depressing the pin of the microswitch 615 to actuate the latter in one direction when the shaft is in one position, and releasing said pin to actuate the microswitch in the other direction when the shaft is turned 90 degrees to a second position. As shown in Fig. 18, the gears associated with the shaft 51 are in the low-speed condition and the microswitch 615 is closed from the hinge to the bottom terminal. In this condition, closing either the prism switch 590 or the film buckle switch 591 causes current to be carried to the coil of a relay 617, opening the circuit feed to all controls so that all stop-motion circuits and manual controls for the camera and projector solenoid are rendered inoperative. Alternatively, when the gears are shifted to the high speed condition, the microswitch 615 is closed from the hinge to the top terminal, and closing either of the switches 590 or 591 causes current to be carried to the coil of relay 610, opening the circuit to holding coil 619 of the motor magnetic switch 604 and thereby cutting off the current to the main drive motor 32. When this occurs, the motor 32 can be restarted only by first clearing the condition at microswitch 590 or 591 which caused the motor to stop, and then actuating the motor starter switch 604 through a manual push button 621.

On the opposite side of the shaft 51 from switch 615 is a single pole single throw microswitch 623 which is closed when the gears are in low speed and open when they are in high. When the microswitch 623 is closed, all of the distributor circuits and manual controls are operative, but when the switch is opened, the distributor circuits as well as the manual controls are rendered inoperative. The purpose of this arrangement is to prevent the use of the stop motion mechanism when the machine is operating at high speed, under which conditions the mechanism is apt to be damaged by the excessive stresses resulting from the inertia of the parts.

A third microswitch 625 is mounted on the housing 35 beneath the shaft 51 and is likewise actuated when the shaft is turned to shift gears. The switch 625 is a single pole double throw switch which, when in the low speed position shown in Fig. 18, provides a circuit to the coil of a camera relay 627 that can be closed by pressing the camera start button 629. Thus, when the machine is in low gear and the button 629 is pressed, the camera relay 627 is energized and held, causing the camera solenoid 132 to engage its clutch and remain in engagement for straight printing. When the microswitch 625 is in the high speed position (not shown) current is immediately applied to the coil of relay 627, thereby closing the circuit to the camera solenoid 132 and rendering the push button 629 inoperative.

The wires carrying the single phase 110-220 volt current from line source 600 are brought into a main light switch 630 located in the base of the machine, and leading from this switch are three wires 631, 632, and 633. Wire 631 is connected to a bus bar 634; wire 632 is connected to a circuit breaker 635; and wire 633 is connected to a switch 636 on the panel enabling the lamp 250 to be connected either directly to the line by throwing the switch down or to cut it into a voltage regulator 254 by throwing the switch up. Both positions of the switch 636 connect the motor of the fan 253 directly to the 110 volt line current. A voltmeter 637 indicates the voltage across the lamp terminals.

Current is transmitted from the circuit breaker 635 through a wire 640 to the primary winding of a step-down transformer 641, returning to the neutral bus 634 through a wire 642. Eighteen volt current from the secondary winding of the transformer is carried to one terminal of all relay coils and to one terminal of a resistor 643 which lowers the voltage to 6 volts for the warning light 593 and for a buzzer 644. Also, when shaft 51 is in the low speed position shown in Fig. 18 and microswitch 623 is closed, eighteen volt current from the secondary winding of the transformer is transmitted through the switch 623, across the relay 617, and through a wire 645 to supply current to the manual push button controls 629, 646, and 647 which control the starting and stopping of the camera, camera and projector, and projector, respectively. Current is also supplied by the wire 645 to both of the distributors 376 and 80, the latter being served through the microswitch 103 only when the latter is in the "On" position, as will be described in more detail presently.

It has already been pointed out that the lever arm 286 serves the dual function of gear shift lever and contact arm, carrying current to the rewind motor 272 through resistors 303, 304, and 305. The motor 272 is caused to start up at the lowest speed by means of a microswitch 650 mounted on the housing 276 and actuated by a flat on the shaft 285, said microswitch connecting all three of the resistors in series into the line of the rewind motor 272. When the arm 286 is in contact with either of points 300, resistors 303 and 304 are connected in series into the line of the rewind motor. Contact of the arm with either of points 301 causes resistor 303, alone, to be connected into the line; while contact with points 302 connects the motor directly into the line. A microswitch 651 mounted on the front of housing 151 is actuated by a flat on shaft 160 when the latter is turned to shift the projector drive from the main drive motor 32 into forward or reverse, and functions to open the circuit to the rewind motor 272 when the projector drive is in gear, so that the rewind motor cannot be made to drive the transmission gearing and the main drive motor 32 as well as the projector mechanism.

As previously brought out, the selector switch 380 determines the function of the switch panel 378, said switch having two contact arms 652 and 653 which are mounted on a common shaft and which receives current impulses from the distributor 376 and switch panel 378. Arm 652 sweeps over six contacts A, B, C, D, E, and F, while arm 653 sweeps over contacts A', B', C', D', E', and F'. Contact A is a dead contact and represents the "Off" station of the switch. Contact B is the "Projector Start" station, and receives from the arm 652 the current impulses originating from the distributor 376, said impulses being carried to a three pole single throw toggle switch 654, which is known as the "Continuous-Stop Motion" switch. The switch 654 will be normally closed, i. e., at "Continuous" position, whenever the selector switch 380 is in use, causing current to be transmitted through the left hand pole of the switch 654 to the bridge terminal position of the "On-Off" push button 647, thence through the normally closed, or "Off" branch of the switch 647, down to a normally closed pole 655 of a relay 656, and then over to the coil of a relay 660. Relay 660 is a two pole single throw relay, the right hand leg of which is a holding leg completing a second circuit to the coil whereby the relay is held closed after receiving but a momentary impulse from the distributor 376 through the previously described circuit. Current for the holding leg of relay 660 is derived from a junction 661 with wire 645 leading to the distributor arm 372, and is transmitted through the distributor "Off-On" microswitch 103, across the normally closed pole of a relay 662, and to the stationary contact of the holding leg of relay 660.

The left hand leg of the relay 660 is the operating leg and, when closed, carries current from the circuit breaker panel 635 to the projector solenoid 132 to energize the latter. From the foregoing, it will be seen that a momentary current impulse received from the distributor 376 as the latter sweeps over a closed switch on the panel 378 causes the projector solenoid to be energized and thereafter held so that the projector is made to operate continuously.

Contact C on the selector switch 380 is the "Projector Stop" station, and carries the current impulse of the distributor 376 from the arm 652 to the coil of a relay 663, causing the latter to open. Opening of the relay 663 interrupts the current to the holding leg of relay 660, thereby causing the latter to open and breaking the circuit to the projector solenoid 132. When this happens the projector becomes declutched from the driving motor and comes to a stop.

Contact D is the "Both Stop" station, and transmits the current impulse of the distributor 376 from the arm 652 to the coil of relay 662, opening the latter and interrupting the holding current supplied to relays 660, 627, and 664. As previously described, relays 660 and 627 carry current to the projector and camera solenoids 132, respectively, while relay 664 carries current to both and is energized by pressing the top or "Start" button of push button 646. Pressing the bottom or "Stop" button 646 opens the holding circuit of relay 664 and causes both of the solenoids to be de-energized.

Contact E is the "Camera Stop" station, and transmits the current impulse of the distributor 376 from the arm 652 to the coil of a normally closed relay 665, opening the latter and interrupting the current to the holding leg of relay 627. This interruption of the holding current causes relay 627 to open, breaking the circuit to the camera solenoid 132 and causing the camera to be declutched from the driving motor.

Contact F is dead, but contact F', which is engaged by arm 653, is the "Buzz" station and transmits the current impulse of the distributor 376 from arm 653 to the buzzer 644. The purpose of this arrangement is to by-pass the pushbutton 381 so that the buzzer will sound each time an impulse is received from the distributor, without requiring the push button switch 381 to be held down. Inasmuch as the buzzer 644 is the only device which should by-pass the switch 381, the other contacts A', B', C', D', and E' are dead.

When the distributor switch 103 is switched to the "On" position, two functions are performed, the first being to open the holding current circuit to relays 660, 627, and 644, and the second being to transmit current from the junction 661 with wire 645 down to the coils of relays 656 and 666, closing both of them. Relay 656 functions as a transfer relay, transferring the circuit of the coils of relays 660 and 627 from manual push-button operation to the automatic operation of the 12-point distributor 80. To this end, the circuit from the coil of the projector relay 660 is carried through the left leg 655 of relay 656, up to the bottom wire 599 of the twelve switch panel 596. At the same time, the circuit from this coil of the camera relay 627 is carried through the right leg 672 of relay 656 up to the top wire 598 of the switch panel 596.

Relay 666 is a transfer relay, transferring the control of push buttons 646 from relay 664 to relay 673 when the legs of relay 666 are in the vertical position. Hence, when the "On" or top push-button 646 is pressed, relay 673 closes, transmitting current to the finger 81 of distributor 80 and at the same time completing a holding circuit for holding relay 673 closed. The holding circuit extends down through the right hand leg of relay 673, through the left hand leg of relay 666, up through the center pole of "Continuous-Stop Motion" switch 654 (which must be closed), over to the bridge terminal of "Camera-Projector" push-button 646, and thence down to the right hand leg of relay 666, and up to the coil of relay 673, thereby completing the circuit.

The right hand pole of the "Continuous-Stop Motion" switch 654 is in the holding circuit of the "Camera" manual push button 629, and when open for stop-motion, the holding circuits of all three relays 660, 627, and 664 are broken.

It is believed that the operation of the machine will be clearly understood by those skilled in the art from the preceding description, and further discussion of such operation at this point is not deemed necessary.

While we have shown and described in considerable detail what we believe to be the preferred embodiment of our invention, it is to be understood that such detailed description is not in any sense restrictive, but that widely differing means might be used to accomplish the same functions without departing from the broad framework of the invention, as set forth in the appended claims.

We claim:

1. An optical printer comprising a projector and a camera, a motor, transmission means connecting said motor with both said camera and said projector to drive the respective mechanisms thereof in synchronism, solenoid-operated clutch means in said transmission between said motor and each of said mechanisms, a distributor operatively connected to said transmission between said motor and said clutch means, said distributor having a plurality of contact points and means for successively closing an electrical circuit between a source of electrical current and each of said points, and a plurality of electrical switches connected one to each of said contact points, said switches being connected in a circuit so as to energize the solenoids of said clutch means to actuate the latter in a sequence determined by the arrangement of open and closed switches.

2. An optical printer comprising a projector and a camera, a motor, transmission means connecting said motor with both said camera and said projector to drive the respective mechanisms thereof in synchronism, solenoid operated clutch means in said transmission between said motor and each of said mechanisms, a distributor operatively connected to said transmission between said motor and said clutch means, said distributor having a plurality of contact points and means for successively closing an electrical circuit between a source of electrical current and each of said points, and a plurality of double throw switches connected one to each of said contact points, said switches being connected to circuits associated with both of said clutch solenoids whereby the camera clutch is actuated when any one of said switches is in one of its operating positions, and the projector clutch is actuated when one of said switches is in its other operating position.

3. An optical printer comprising a projector and a camera, motor means, transmission means connecting said motor means with said camera and said projector to drive the respective mechanisms thereof in synchronism, a camera clutch in said transmission between said motor means and the camera mechanism, a projector clutch in said transmission between said motor means and the projector mechanism, electrically operated means for actuating said clutches independently of one another, a distributor operatively connected to said transmission ahead of said clutches, said distributor having a plurality of contact points and means for successively closing an electrical circuit between a source of current and each of said points, and means including a plurality of selectively operable control switches connected to said points and operable to transmit current impulses from said distributor to said actuating means of one or the other of said clutches in a predetermined sequence.

4. An optical printer comprising a projector and a camera, a motor, transmission means connecting said motor with both said camera and said projector to drive the respective mechanisms thereof in synchronism, a projector clutch in said transmission between said motor and the projector mechanism, electrically operated means for actuating said clutch, a distributor operatively connected to said transmission, said distributor having a plurality of contact points and means for successively closing an electrical circuit between a source of current and each of said points, a switch panel having a plurality of normally open switches thereon, said switches being connected to said distributor contact points to receive current impulses therefrom, a relay connected to the circuit of the actuating means for said projector clutch and operable to cause said actuating means to engage and hold said projector clutch on a predetermined frame of the film in said camera responsive to a momentary current impulse received from said distributor through a preselected closed switch on said panel, and a normally open switch in the circuit to said relay, said last-named switch being closed and held when the film in the camera is within a certain number of frames of said predetermined frame, whereby the next current impulse received by said closed switch on said panel from said distributor is transmitted to said relay to operate the same and engage said projector clutch.

5. An optical printer comprising a projector and a camera, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for periodically actuating said clutches independently of one another, a distributor operatively connected to said transmission, said distributor having a plurality of contact points and means for successively closing an electrical circuit between a source of electric current and each of said points, and means actuated by a current impulse received from one of said distributor points for controlling the operation of said electrically operated clutch actuating means to start or stop said projector, or to stop said camera, or to stop both simultaneously on a predetermined frame of the film running through said camera.

6. An optical printer comprising a projector and a camera, a motor, transmission means connecting said motor with both said camera and said projector to drive the respective mechanisms thereof in synchronism, a projector clutch in said transmission between said motor and the projector mechanism, electrically operated means for actuating said clutch, a distributor operatively connected to said transmission, said distributor having a plurality of contact points and means for successively closing an electrical circuit between a source of current and each of said points at the rate of one point per frame of film running through said camera, a switch panel having a plurality of normally open switches thereon connected to said points, and means actuated by a current impulse received from said distributor through a closed switch on said panel for energizing said clutch actuating means to start said projector on a predetermined frame of the film in said camera.

7. An optical printer comprising a projector and a camera, a motor, transmission means connecting said motor with both said camera and said projector to drive the respective mechanisms thereof in synchronism, a projector clutch in said transmission between said motor and the projector mechanism, electrically operated means for actuating said clutch, a distributor operatively connected to said transmission, said distributor having a plurality of contact points and means for successively closing an electrical circuit between a source of current and each of said points at the rate of one point per frame of film running through said camera, a switch panel having a plurality of normally open switches thereon connected to said points, and means actuated by a current impulse received from said distributor through a closed switch on said panel for energizing said clutch actuating means to stop said projector on a predetermined frame of the film in said camera.

8. An optical printer comprising a projector and a camera, a motor, transmission means connecting said motor with both said camera and said projector to drive the respective mechanisms thereof in synchronism, a camera clutch in said transmission between said motor and the camera mechanism, electrically operated means for actuating said clutch, a distributor operatively connected to said transmission, said distributor having a plurality of contact points and means for successively closing an electrical circuit between a source of current and each of said points at the rate of one point per frame of film running through said camera, a switch panel having a plurality of normally open switches thereon connected to said points, and means actuated by a current impulse received from said distributor through a closed switch on said panel for energizing said clutch actuating means to stop said camera on a predetermined frame of the film running through the same.

9. An optical printer comprising a projector and a camera, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission, said distributor having a plurality of contact points and means for successively closing an electrical circuit between a source of current and each of said points at the rate of one point per frame of film running through said camera, a switch panel having a plurality of normally open switches thereon connected to said points, and means actuated by a current impulse received from said distributor through a closed switch on said panel for energizing said clutch actuating means to stop both said camera and said projector simultaneously on a predetermined frame of the film running through said camera.

10. An optical printer comprising a projector and a camera, a motor, transmission means connecting said motor with both said camera and said projector to drive the respective mechanisms thereof in synchronism, a projector clutch in said transmission between said motor and the projector mechanism, electrically operated means for actuating said clutch, a distributor operatively connected to said transmission, said distributor having a plurality of contact points and means for successively closing an electrical circuit between a source of current and each of said points at the rate of one point per frame of film running through said camera, a switch panel having a plurality of normally open switches thereon connected to said points, means actuated by a current impulse received from said distributor through a closed switch on said panel for energizing said clutch actuating means to stop said projector on a predetermined frame of the film in said camera, and other means actuated by a current impulse received through a closed switch on said panel for energizing said clutch actuating means to start said projector on a predetermined frame of the film in said camera.

11. An optical printer comprising a projector and a camera, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission, said distributor having a plurality of contact points and means for successively closing an electrical circuit between a source of current and each of said points at the rate of one point per frame of film running through said camera, a switch panel having a plurality of normally open switches thereon connected to said points, means actuated by a current impulse received from said distributor through a closed switch on said panel for energizing said clutch actuating means to start said projector on a predetermined frame of the film in said camera, and other means actuated by a current impulse received through a closed switch on said panel for energizing said clutch actuating means to stop said camera on a predetermined frame of the film therein.

12. An optical printer comprising a projector and a camera, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission, said distributor having a plurality of contact points and means for successively closing an electrical circuit between a source of current and each of said points at the rate of one point per frame of film running through said camera, a switch panel having a plurality of normally open switches thereon connected to said points, means actuated by a current impulse received from said distributor through a closed switch on said panel for energizing said clutch actuating means to stop said projector on a predetermined frame of the film in said camera, and other means actuated by a current impulse received through a closed switch on said panel for energizing said clutch actuating means to stop said camera on a predetermined frame of the film therein.

13. An optical printer comprising a projector and a camera, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission, said distributor having a plurality of contact points and means for successively closing an electrical circuit between a source of current and each of said points at the rate of one point per frame of film running through said camera, a switch panel having a plurality of normally open switches thereon connected to said points, means actuated by a current impulse received from said distributor through a closed switch on said panel for energizing said clutch actuating means to start said projector on a predetermined frame of the film in said camera, other means actuated by a current impulse received through a closed switch on said panel for energizing said clutch actuating means to stop said camera on a predetermined frame of the film therein, and still other means actuated by a current impulse received through a closed switch on said panel for energizing said clutch actuating means to stop both said camera and said projector simultaneously on a predetermined frame of the film in said camera.

14. An optical printer comprising a projector and a camera, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission, said distributor having a plurality of contact points and means for successively closing an electrical circuit between a source of current and each of said points at the rate of one point per frame of film running through said camera, a switch panel having a plurality of normally open switches thereon connected to said points, means actuated by a current impulse received from said distributor through a closed switch on said panel for energizing said clutch actuating means to stop said projector on a predetermined frame of the film in said camera, other means actuated by a current impulse received through a closed switch on said panel for energizing said clutch actuating means to stop said camera on a predetermined frame of the film therein, and still other means actuated by a current impulse received through a closed switch on said panel for energizing said clutch actuating means to stop both said camera and said projector simultaneously on a predetermined frame of the film in said camera.

15. An optical printer comprising a projector and a camera, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission ahead of said clutches, said distributor having a plurality of contact points and means for successively closing an electrical circuit between a source of current and each of said points, a switch panel having a plurality of normally open switches thereon connected to said points, and relay means actuated by a current impulse received from said distributor through a closed switch on said panel for energizing said clutch actuating means to engage either of said clutches for one frame of the film running through the mechanism associated therewith.

16. An optical printer comprising a projector and a camera, a motor, transmission means connecting said motor with both said camera and said projector to drive the respective mechanisms thereof in synchronism, a camera clutch in said transmission between said motor and the camera mechanism, electrically operated means for actuating said clutch, a distributor operatively connected to said transmission, said distributor having a plurality of contact points and means for successively closing an electrical circuit between a source of current and each of said points, a switch panel having a plurality of normally open switches thereon, said switches being connected to said distributor contact points to receive current impulses therefrom, a relay connected to the circuit of the actuating means for said camera clutch and operable to disengage the latter on a predetermined frame of the film in said camera responsive to a momentary current impulse received from said distributor through a preselected closed switch on said panel, and a normally open switch in the circuit to said relay, said last-named switch being closed and held when the film in the camera is within a certain number of frames of said predetermined frame, whereby the next current impulse received by said closed switch on said panel from said distributor is transmitted to said relay to operate the same and disengage said camera clutch.

17. An optical printer comprising a projector and a camera, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission ahead of said clutches, said distributor having a plurality of contact points and means for successively closing an electrical circuit between a source of current and each of said points, means connected to said points and actuated by current impulses derived therefrom for energizing the actuating means for either of said clutches in a predetermined sequence, another distributor having a plurality of contact points and means for successively closing an electrical circuit between a source of current and each of said points at the rate of one point per frame of film running through said camera, a switch panel having a plurality of normally open switches thereon connected to said last named points, and means actuated by a current impulse received from said last named distributor through a closed switch on said panel for energizing said clutch actuating means to start said projector on a predetermined frame of the film in said camera.

18. An optical printer comprising a projector and a camera, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission ahead of said clutches, said distributor having a plurality of contact points and means for successively closing an electrical circuit between a source of current and each of said points, means connected to said points and actuated by current impulses derived therefrom for energizing the actuating means for either of said clutches in a predetermined sequence, another distributor having a plurality of contact points and means for successively closing an electrical circuit between a source of current and each of said points at the rate of one point per frame of film running through said camera, a switch panel having a plurality of normally open switches thereon connected to said last named points, and means actuated by a current impulse received from said last named distributor through a closed switch on said panel for energizing said clutch actuating means to stop said projector on a predetermined frame of the film in said camera.

19. An optical printer comprising a projector and a camera, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission ahead of said clutches, said distributor having a plurality of contact points and means for successively closing an electrical circuit between a source of current and each of said points, means connected to said points and actuated by current impulses derived therefrom for energizing the actuating means for either of said clutches in a predetermined sequence, another distributor having a plurality of contact points and means for successively closing an electrical circuit between a source of current and each of said points at the rate of one point per frame of film running through said camera, a switch panel having a plurality of normally open switches thereon connected to said last named points, and means actuated by a current impulse received from said last named distributor through a closed switch on said panel for energizing said clutch actuating means to stop said camera on a predetermined frame of the film running through the same.

20. An optical printer comprising a projector and a camera, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission ahead of said clutches, said distributor having a plurality of contact points and means for successively closing an electrical circuit between a source of current and each of said points, means connected to said points and actuated by current impulses derived therefrom for energizing the actuating means for either of said clutches in a predetermined sequence, another distributor having a plurality of contact points and means for successively closing an electrical circuit between a source of current and each of said points at the rate of one point per frame of film running through said camera, a switch panel having a plurality of normally open switches thereon connected to said last named points, and means actuated by a current impulse received from said last named distributor through a closed switch on said panel for energizing said clutch actuating means to stop both said camera and said projector simultaneously on a predetermined frame of the film running through said camera.

21. An optical printer comprising a projector, a camera, an objective lens disposed between said projector and said camera, said camera and said lens being slidably supported for movement along the axis of the lens, means for simultaneously moving said lens and said camera in opposite directions and at such rates of travel, respectively, as to maintain the image at the camera aperture in focus for all distance of the lens from the projector aperture, a motor, transmission means connecting said motor with both said camera and said projector to drive the respective mechanism thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission ahead of said clutches, said distributor having a plurality of contact points and means for successively closing an electrical circuit between a source of current and each of said points, and means connected to said points and actuated by current impulses derived therefrom for energizing the actuating means for either of said clutches in a predetermined sequence.

22. An optical printer comprising a projector, a camera, an objective lens disposed between said projector and said camera, said camera and said lens being slidably supported for movement along the axis of the lens, means for simultaneously moving said lens and said camera in opposite directions and at such rates of travel, respectively, as to maintain the image at the camera aperture in focus for all distance of the lens from the projector aperture, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission, said distributor having a plurality of contact points and means for successively closing an electrical circuit between a source of current and each of said points, and means actuated by a current impulse received from one of said distributor points for energizing said clutch actuating means to start or stop said projector, or to stop said camera, or to stop both simultaneously on a predetermined frame of the film running through said camera.

23. An optical printer comprising a projector, a camera, an objective lens disposed between said projector and said camera, said camera and said lens being slidably supported for movement along the axis of the lens, means for simultaneously moving said lens and said camera in opposite directions and at such rates of travel, respectively, as to maintain the image at the camera aperture in focus for all distance of the lens from the projector aperture, a motor, transmission means connecting said motor with both said camera and said projector to drive the respective mechanisms thereof in synchronism, a camera clutch in said transmission between said motor and the camera mechanism, a projector clutch in said transmission between said motor and the projector mechanism, electrically operated means for actuating said clutches independently of one another, a distributor operatively connected to said transmission ahead of said clutches, said distributor having a plurality of contact points and means for successively closing an electrical circuit between a source of current and each of said points, means connected to said points and actuated by current impulses derived therefrom for energizing the actuating means for either of said clutches in a predetermined sequence, another distributor having a plurality of contact points and means for successively closing an electrical circuit between a source of current and each of said points at the rate of one point per frame of film running through said camera, a switch panel having a plurality of normally open switches thereon connected to said last named points, and means actuated by a current impulse received from said last named distributor through a closed switch on said panel for energizing said clutch actuating means to start or stop said projector, or to stop said camera, or to stop both simultaneously on a predetermined frame of the film running through said camera.

24. An optical printer comprising a projector and a camera, a motor, transmission means connecting said motor with both said camera and said projector to drive the respective mechanisms thereof in synchronism, a projector clutch in said transmission between said motor and the projector mechanism, electrically operated means for actuating said clutch, a motor driven distributor operable to deliver one current impulse for each frame of film passing through said camera, means for directing said current impulses from said distributor to said clutch operating means so as to actuate said projector clutch for a single frame in any predetermined frame sequence of the film running through said camera, another distributor operable to deliver one current impulse for each frame of film passing through said camera, and means responsive to one of the current impulses from said last-named distributor for energizing said clutch operating means to actuate said projector clutch so as to start or stop said projector on a predetermined frame of the film in said camera.

25. An optical printer comprising a projector, a camera, an objective lens disposed between said camera and said projector, a motor, transmission means connecting said motor with both said camera and said projector to drive the respective mechanisms thereof in synchronism, said transmission means including a two-speed gear box having means for shifting the gears to high or low speed, a camera clutch in said transmission between said motor and camera mechanisms, a projector clutch in said transmission between said motor and projector mechanisms, electrically operated means for actuating said clutches independently of one another, a motor driven distributor adapted to deliver one current impulse for each frame of film passing through either said projector or said camera, means for directing the successive current impulses from said distributor to said clutch actuating means so as to operate said camera clutch and said projector clutch in a predetermined frame sequence, another distributor operable to deliver a current impulse for each frame of film passing through said camera, a switch panel having a plurality of normally open switches thereon connected to said last-named distributor, means actuated by a current impulse received from said last-named distributor through a closed switch on said panel for energizing said clutch actuating means so as to operate said projector clutch on a predetermined frame of the film in said camera, viewing means movable into the axis of said lens for the purpose of inspecting the image formed by the lens, a normally closed relay serially arranged in the circuit carrying current to said two distributors, another normally closed relay serially arranged in the circuit carrying current to said motor, and means including a switch operated by said viewing means when the latter is in front of said lens for energizing said first named relay to open the circuit to said distributors when said gear box is in the low-speed condition, or energizing said last-named relay to open the circuit to said motors, when said gear box is in the high-speed condition.

26. An optical printer having a camera and a projector, and including: driving means operable to drive said camera; other driving means operable to drive said projector independently of said camera; a plurality of selective control means individually positionable and operatively connected to control the operation of each of said driving means; and timing means connected to each of said selective means to establish a cyclic operation of said plurality of selective means, whereby a sequence of operation of said camera and projector is established, and said sequence is repeated each cycle of said timing means.

27. An optical printer having a camera and a projector, and including: driving means operable to drive said camera; other driving means operable to drive said projector independently of said camera; a plurality of selective control means individually positionable and operatively connected to control the operation of each of said driving means; and cycling means connected to said plurality of selective means for successively energizing each of said selective means in a repetitive cycle, whereby said camera and said projector are operated in a recurring sequence.

28. An optical printer having a camera and a projector and including: camera driving means operable to drive said camera; projector driving means operable to drive said projector independently of said camera; camera control means actuable to operate said camera driving means for the passage of a unit length of film through said camera; projector control means actuable to operate said projector driving means for the passage of a unit length of film through said projector; a plurality of selective control means individually positionable and operatively connected to control the operation of each of said camera and projector control means; and timing means connected to said plurality of selective means for sequentially activating each of said selective means, whereby a sequence of operations of said camera and projector are established, and said sequence is repeated each cycle of said timing means.

29. An optical printer having a camera and a projector and including: camera driving means operable to drive said camera; projector driving means operable to drive said projector independently of said camera; camera control means actuable to operate said camera driving means for the passage of a unit length of film through said camera; projector control means actuable to operate said projector driving means for the passage of a unit length of film through said projector; a plurality of multi-position switches individually positionable to control the operation of each of said control means; and timing means connected to said switches for sequentially energizing each of said switches, whereby a sequence of operations of said camera and projector are established, and said sequence is repeated each cycle of said timing means.

30. An optical printer having a camera and a projector and including: camera driving means operable to drive said camera; projector driving means operable to drive said projector independently of said camera; camera control means actuable to operate said camera driving means for the passage of a unit length of film through said camera; projector control means actuable to operate said projector driving means for the passage of a unit length of film through said projector; a plurality of multi-position switches individually positionable to control the operation of each of said control means; and cycling switching means connected to said multi-position switches for individually and sequentially energizing each of said multi-position switches, whereby a sequence of operations of said camera and projector are established, and said sequence is repeated each cycle of said timing means.

ROBERT P. SHEA.
OSCAR H. JAROSCH.
LINWOOD G. DUNN.
CECIL D. LOVE.

REFERENCES CITED

The following references are of record in the file of this patent:

UNITED STATES PATENTS

| Number | Name | Date |
|---|---|---|
| 1,204,098 | Watson | Nov. 7, 1916 |
| 1,275,249 | Hlavaty | Aug. 13, 1918 |
| 1,645,367 | August | Oct. 11, 1927 |
| 1,755,105 | Douglas | Apr. 15, 1930 |
| 1,934,514 | Thun | Nov. 7, 1933 |
| 1,950,166 | Durholz | Mar. 6, 1934 |
| 2,002,188 | Ross | May 21, 1935 |
| 2,039,213 | Debrie | Apr. 28, 1936 |
| 2,172,330 | Bryce | Sept. 5, 1939 |
| 2,256,385 | Evans | Sept. 16, 1941 |
| 2,389,087 | Schubert | Nov. 13, 1945 |

FOREIGN PATENTS

| Number | Country | Date |
|---|---|---|
| 16,353 | Great Britain | July 16, 1913 |
| 719,351 | France | Nov. 14, 1931 |